United States Patent [19]  [11] 3,904,617
Pelz et al.  [45] Sept. 9, 1975

[54] PROCESS FOR PREPARING NEW HETEROCYCLIC DERIVATIVES

[75] Inventors: Karel Pelz, Montreal; Thomas A. Dobson, Dollard des Ormeaux, both of Canada

[73] Assignee: Ayerst, McKenna & Harrison Ltd., Quebec, Canada

[22] Filed: Oct. 12, 1972

[21] Appl. No.: 297,130

[52] U.S. Cl............. 260/243 R; 424/246; 424/283; 424/275; 260/326.16; 260/326.12 R; 260/469; 260/590; 260/618 F; 260/345.2; 260/327 R; 260/326.34; 260/326.5 B; 260/326.82; 260/293.57; 260/293.58; 260/247.1 P; 260/247.2 B; 260/247.7 F; 260/268 TR; 260/244 R
[51] Int. Cl.$^2$............. C07D 279/14; C07D 265/28; C07D 311/94; C07D 335/04
[58] Field of Search........ 260/345.2, 243 R, 326.34, 260/326.5, 326.82, 293.57, 293.58, 247.1 P, 247.2 B, 247.7 F, 268 TR, 227 R, 244 R

[56] References Cited
UNITED STATES PATENTS
3,532,719  10/1970  Theimer.......................... 260/345.2

OTHER PUBLICATIONS

Rieche et al., "Synthetic Methods of Organic Chemistry," Vol. 12, p. 361, S. Karger, Pub., New York, (1958).

Warren et al., "Synthetic Methods of Organic Chemistry," Vol. 13, pp. 361–362, S. Karger, Pub., New York, (1959).

Primary Examiner—John M. Ford
Attorney, Agent, or Firm—John P. Floyd

[57] ABSTRACT

Pyrano[3,4-b]indole, 1H-1,4-oxazino[4,3-a]indole and indeno[2,1-c]pyran derivatives characterized by having an amino(lower)alkyl radical attached to the 1 position of the heterocyclic ring system and their corresponding thio analogs are prepared by the condensation of a ketalkylamine with an indole-3-ethanol, indole-1-ethanol or indene-3-ethanol respectively or in the case of the thio analogs the corresponding ethanethiol or ethylthiosulfate salt thereof. The products of this condensation and their corresponding acid addition salts are useful antidepressant and antiulcer agents.

32 Claims, No Drawings

3,904,617

PROCESS FOR PREPARING NEW HETEROCYCLIC DERIVATIVES

BACKGROUND OF THE INVENTION

1. Field of Invention

This invention relates to a process for preparing heterocyclic derivatives having useful pharmacologic properties. More particularly, it relates to an efficient method for preparing pyranoindole, oxazinoindole and indenopyran derivatives as well as their corresponding thio analogs. The compounds prepared by this process are useful antidepressant agents with a low order of toxicity. In addition, some possess antiulcer activity.

2. Description of the Prior Art

Previously reported preparations of compounds having one of the aforementioned ring systems bear no relationship to the process of the present invention. For example, the former processes either lead to the heterocyclic system at a higher state of oxidation and/or unlike the present process do not permit the facile and direct introduction of a variety of substituents into the oxygen or sulfur containing ring being formed. For instance, see J. A. Elvridge and F. S. Spring, J. Chem. Soc., 2935 (949) or M. C. Freed et al., J. Med. Chem., 7, 628 (1964).

Indeed the reaction of an indole or indane bearing an ethanol or ethanethiol substituent with a ketone to form a tricyclic heterocycle appears to be without precedent. In fact one has to travel to the remote field of furopyran chemistry before a process bearing some similarity is found; i.e., for example, the reaction of furan-3-ethanol with certain ketones to form bicyclic heterocycles, Germ. Offenleg. No. 2,051,496, published Apr. 29, 1971.

SUMMARY OF THE INVENTION

According to the present invention a compound of formula I

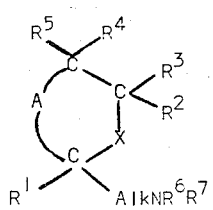

in which $R^1$ is lower alkyl, $R^2$, $R^3$, $R^4$ and $R^5$ are the same or different selected from the group consisting of hydrogen and lower alkyl, $R^6$ and $R^7$ are either the same or different selected from the group consisting of hydrogen or lower alkyl, or $R^6$ and $R^7$ together with the nitrogen atom to which they are joined form a heterocyclic amine radical selected from the group consisting of 1-pyrrolidinyl, piperidino, morpholino, piperazino, 4-(lower alkyl)-1-piperazinyl and 4-[hydroxy(lower)alkyl]-1-piperazinyl, Alk is an alkylene selected from the group consisting of $CR^8R^9$, $CR^8R^9CR^{10}R^{11}$, $CR^8R^9CR^{10}R^{11}CR^{12}R^{13}$ and $CR^8R^9CR^{10}R^{11}CR^{12}R^{13}CR^{14}R^{15}$ wherein $R^8$, $R^9$, $R^{10}$, $R^{11}$, $R^{12}$, $R^{13}$, $R^{14}$ and $R^{15}$ are hydrogen or lower alkyl, X is oxy or thio and A is a divalent radical selected from the group consisting of

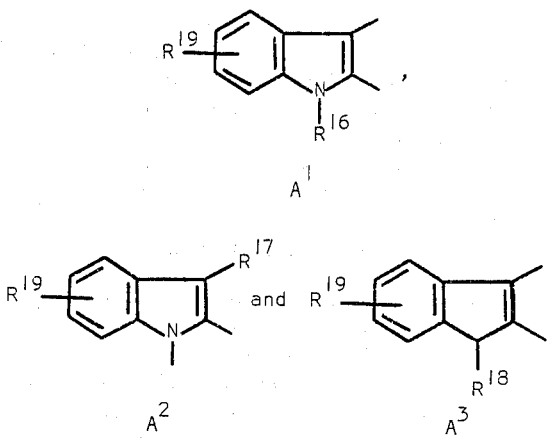

in which $R^{16}$ is hydrogen or lower alkyl, $R^{17}$ is lower alkyl, $R^{18}$ is hydrogen or lower alkyl, and $R^{19}$ is hydrogen, lower alkyl, hydroxy, lower alkoxy, lower alkanoyloxy or halo, or a corresponding acid addition salt thereof, is prepared by treating a compound of formula $B-CR^4R^5CR^2R^3Y$ (II) in which B is a monovalent radical selected from the group consisting of

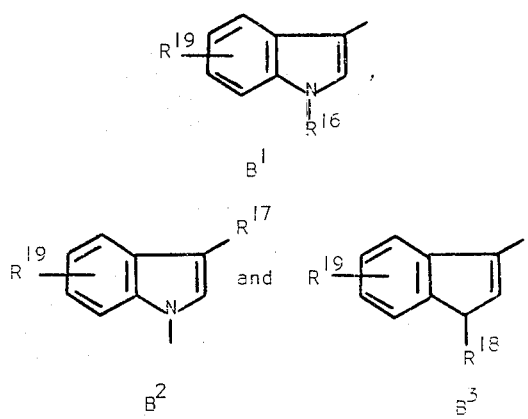

in which $R^{16}$, $R^{17}$, $R^{18}$ and $R^{19}$ are as defined herein, $R^2$, $R^3$, $R^4$ and $R^5$ are as defined herein and Y is hydroxy, mercapto, $-S-SO_3-Na$ or $-S-SO_3-K$, with a compound of formula $R^1CO-Alk-NR^6R^7$ (III) in which $R^1$, Alk, $R^6$ and $R^7$ are as defined herein or a corresponding acid addition salt thereof, in the presence of an acid catalyst.

DETAILED DESCRIPTION OF THE INVENTION

The term "lower alkyl" as used herein contemplates straight chain alkyl radicals containing from one to six carbon atoms and branched chain alkyl radicals containing three to four carbon atoms and includes methyl, ethyl, propyl, isopropyl, butyl, isobutyl, pentyl and the like.

The term "lower alkoxy" as used herein contemplates both straight and branched chain alkoxy radicals containing from one to four carbon atoms and includes methoxy, ethoxy, isopropoxy and the like.

The term "lower alkanoyloxy" as used herein contemplates both straight and branched chain alkanoyloxy radicals containing from two to six carbon atoms and includes acetoxy, propionyloxy, hexanoyloxy and the like.

The term "halo" as used herein contemplates halogens and includes fluorine, chlorine, bromine and iodine.

The compounds of formula I are capable of forming acid addition salts with pharmaceutically acceptable acids. Such acid addition salts are included within the scope of this invention.

The acid addition salts are prepared by reacting the corresponding base form of the compound of formula I with substantially one or two equivalents, depending on the number of basic nitrogens in the compound, or preferably with an excess of the appropriate acid in an organic solvent, for example, ether or an ethanolether mixture. These salts, when administered to mammals, possess the same pharmacologic activities as the corresponding bases. For many purposes it is preferable to administer the salts rather than the base compounds. Among the acid addition salts suitable for this purpose are salts such as the sulfate, phosphate, lactate, tartrate, maleate, citrate, hydrobromide and hydrochloride. Both the base compounds and the salts have the distinct advantage of possessing a relatively low order of toxicity.

Also included in this invention are the stereochemical isomers of the compounds of formula I which result from asymmetric centers, contained therein. These isomeric forms may be prepared by different methods and are purified readily by crystallization or chromatography.

Individual optical isomers, which might be separated by fractional crystallization of the diastereoisomeric salts formed thereof, for instance, with d- or l-tartaric acid or D-(+)-α-bromocamphor sulfonic acid, are also included.

Antidepressant Activity

The useful antidepressant activity of the compounds of formula I and their acid addition salts with pharmaceutically acceptable acids may be demonstrated in standard pharmacologic tests, such as, for example, the tests described by F. Hafliger and V. Burckhart in "Psychopharmacological Agents," M. Gordon, Ed., Academic Press, New York and London, 1964, pp. 75–83.

More specifically, as noted in the latter reference the antidepressant properties of a compound may be demonstrated by its capacity to antagonize the depressant effects of reserpine. Furthermore, it is well documented that reserpine in animals produces a model depression which can be used for detecting antidepressant properties. Accordingly, the compounds of the present invention antagonize reserpine effects in mice at doses ranging from about 1 to 100 mg/kg. Several of the preferred compounds, for instance, 1-[2-(dimethylamino)ethyl]-1-methyl-1,3,4,9-tetrahydropyrano[3,4-b]indole oxalate (Example 4), 1-methyl-1-[3-(methylamino)propyl]-1,3,4,9-tetrahydropyrano[3,4-b]indole oxalate (Example 14), 1-[2-(dimethylamino)ethyl]-9-ethyl-1-methyl-1,3,4,9-tetrahydrothiopyrano[3,4-b]indole hydrochloride (Example 169), 1,10-dimethyl-1-[3-(methylamino)propyl]-3,4-dihydro-1H-1,4-oxazino[4,3-a]indole hydrobromide (Example 61), 1-(3-aminopropyl)-1,10-dimethyl-3,4-dihydro-1H-1,4-oxazino[4,3-a]indole hydrochloride (Example 71), N,N-1-trimethyl-1,3,4,9-tetrahydroindeno[2,1-c]pyran-1-ethylamine hydrochloride (Example 124), and N,N,1-trimethyl-1,3,4,9-tetrahydroindeno[2,1-c]thiopyran-1-ethylamine hydrochloride (Example 147), antagonize the effects of reserpine in mice at dose ranges from about 1 to 15 mg/kg.

When the compounds of this invention are used as antidepressants in warm-blooded mammals, e.g. rats and mice, they may be used alone or in combination with pharmacologically acceptable carriers, the proportion of which is determined by the solubility and chemical nature of the compound, chosen route of administration and standard biological practice. For example, they may be administered orally in solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular host under treatment. Generally, treatment is initiated with small dosages substantially less than the optimum dose of the compound. Thereafter, the dosage is increased by small increments until the optimum effect under the circumstance is reached. In general, the compounds of this invention are most desirably administered at a concentration level that will generally afford effective results without causing any harmful or deleterious side effects and preferably at a level that is in a range of from about 0.1 mg to about 50 mg per kilo per day, although as aforementioned variations will occur. However, a dosage level that is in the range of from about 0.5 mg to about 25 mg per kilo per day is most desirably employed in order to achieve effective results.

Antiulcer Activity

The compounds of formula I in which A is $A^1$ or $A^2$ possess another useful pharmacologic property; that is; they are useful antiulcer agents. More particularly, the said compounds of this invention exhibit antiulcer activity in standard pharmacologic tests, for example, the test described by D. A. Brodie and L. S. Valitski, Proc. Soc. Exptl. Biol. Med., 113, 998 (1963), based on the prevention of stress-induced ulcers.

When these compounds of formula I are employed as antiulcer agents, they may be formulated and administered in the same manner as described above for their use as antidepressant agents.

Process

The requisite starting material of formula B-$CR^1R^5CR^2R^3Y$ (II), defined above, for the practice of the present process is either known or prepared readily in one of the following methods depending on the definition of B:

When B is $B^1$, the requisite starting materials of formula II in which Y is hydroxy are either known, for example, tryptophol, described by H. R. Snyder and F. J. Pilgrim, J. Am. Chem. Soc. 70, 3770 (1948), or they may be obtained by the following process:

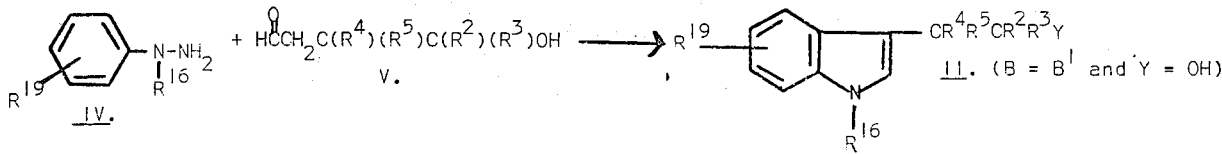

With reference to this process phenylhydrazines of formula IV and their hydroxyaldehyde of formula V are reacted together according to the conditions of the "Fischer Indole Synthesis," for example, see P. L. Julian, E. N. Myer and H. C. Printy, "Heterocyclic Compounds," R. C. Elderfield, Ed., Vol. 3, John Wiley and Sons, Inc., New York, 1952, pp. 8-11, to form the desired starting material (II, B = B¹ and Y = OH).

The phenylhydrazines of formula IV are either known or may be prepared according to known methods. A convenient method involves the diazotization of the appropriately substituted aniline to give the corresponding diazo derivative. The latter compound is then reduced with stannous chloride or sodium sulfite to give the corresponding phenylhydrazine, see L. F. Fieser and M. Fieser, "Advanced Organic Chemistry", Reinhold Publishing Corporation, New York, 1961, p. 734.

The hydroxyaldehydes of formula V are either known, see for example, "Rodd's Chemistry of Carbon Compounds," S. Coffey, Ed., Vol. 1 d, 2nd ed., Elsevier Publishing Co., Amsterdam, 1965, pp. 44–49. or they may be prepared according to known methods. A convenient method involves reduction of an appropriate lactone of formula

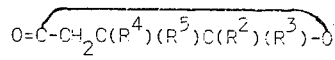

with bis-(3-methyl-2-butyl)borane, H. C. Brown and D. B. Bigley, J. Am. Chem. Soc., 83, 486 (1961), diisobutyl aluminum hydride, L. I. Zakharkin and I. M. Khorlina, Tetrahedron Letters, 619 (1962) or sodium aluminum hydride, L. I. Zakharkin et al., Tetrahedron Letters, 2087 (1963). The appropriate lactones utilized in this condensation are either commercially available, for example, δ-valerolactone, α-methyl-butyrolactone, or they are described with a variety of methods for their preparation in organic chemistry textbooks; such as the textbooks, "Methoden der Organischen Chemie", Houben-Weyl, E. Muller, Ed., Vol. VI/2, Georg Thieme Verlag, Stuttgard, 1963, pp. 561–852 or L. F. Fieser and M. Fieser, "Advanced Organic Chemistry", cited above.

Alternatively, the starting materials of formula II in which B is B¹, R², R³, R⁴ and R¹⁶ are hydrogen and Y is hydroxy may be prepared by lithium aluminum hydride reduction, N. G. Gaylord, "Reduction with Complex Metal Hydrides," Interscience Publishers, Inc., New York 1956, pp. 322–370, of compounds of formula VI described by T. Y. Shen, U.S. Patent No. 3,161,654, Dec. 15, 1964:

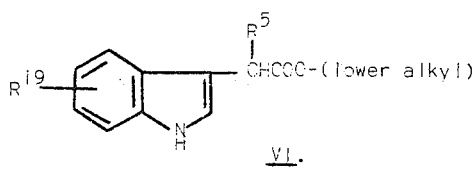

wherein $R^5$ and $R^{19}$ are as defined in the first instance.

The starting materials of formula II in which B is B¹, Y is mercapto, and $R^2$, $R^3$, $R^4$, $R^5$, $R^{16}$ and $R^{19}$ are as defined in the first instance are obtained by the following process: The appropriate compound of formula II (Y = OH), described above, is treated with phosphorus tribromide in an inert solvent, for example, ether, carbon tetrachloride, methylene dichloride, or toluene, to afford the corresponding 3-(2-bromoethyl)-indole derivatives. The latter compound is then converted to the desired starting material of formula II (Y = SH) or formula II (Y = S-SO₃Na or —S-SO₃K) wherein B = B¹ by a procedure similar to that described by N. N. Suvorov and V. N. Buyanov, Khim.-Farm. Zh., 1,4 (1967), [Chem. Abstr. 67, 73474a (1967)], for converting 3-(2-bromoethyl)-indole to indole-3-ethanethiol (II; B = B¹, R², R³, R⁴, R⁵, R¹⁶ and R¹⁹ = H and Y = SH). Accordingly, the appropriate 3-(2-bromoethyl)-indole derivative is treated with sodium or potassium thiosulfate to afford the corresponding sodium or potassium β-(3-indolyl)ethyl thiosulfate derivative, respectively, namely the desired starting materials of formula II (Y = S-SO₃Na or —S-SO₃K) wherein B = B¹. Treatment of the latter derivative with strong alkali for example, sodium or potassium hydroxide, transforms the derivative into the corresponding bis-[ω-(3-indolyl)ethyl]disulfide derivative. Reduction of the latter compound with lithium aluminum hydride gives the desired compounds of formula II.

Alternatively, the preceding thiosulfate derivative is treated with acid, for example, dilute aqueous solutions of hydrochloric acid, sulfuric acid or phosphoric acid, to give directly the latter compound of formula II.

It should be noted that the preceding process is not entirely practical for the preparation of the compounds of formula II in which Y is mercapto, and —S-SO₃Na or -S-SO₃K and R¹⁹ is hydroxy or lower alkanoyloxy. For this reason, the preferred starting materials of formula II for the ultimate preparation of the compounds of formula I in which R¹⁹ is hydroxy or lower alkanoyloxy and Y is thio, —S-SO₃Na or —S-SO₃K are the corresponding compounds of formula II in which R¹⁹ is benzyloxy, readily prepared by the present process. When the latter compounds are used as starting materials in this manner, they are first subjected to the process (II + III → I), described below. Subsequently, the benzyloxy group is removed by hydrogenation, in the presence of a catalyst, for example, 10 percent palladium on carbon, to afford the corresponding compound of formula I in which R¹⁹ is hydroxy. The latter may be converted if desired to the corresponding compound of formula I in which R¹⁹ is lower alkanoyloxy by conventional means, for example, by treatment with the appropriate lower alkanoic anhydride preferably in the presence of pyridine. Likewise, it should be noted that similar use of the starting materials of formula II in which Y is hydroxy and R¹⁹ is benzyloxy to obtain the corresponding compound of formula I in which R¹⁹ is hydroxy or lower alkanoyloxy is preferred.

Secondly, when it is desired to have a requisite starting material of formula II in which B = B², then the said starting material is readily obtained from a corresponding indole precursor of formula VII in which R¹⁷ and R¹⁹ are as defined in the first instance.

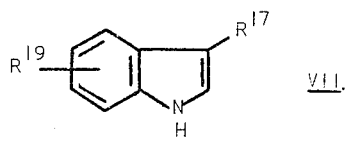

The precursors of formula VII are either well known, for example, skatole and 3-ethylindole, or they may be prepared from indole or known indole derivatives, for example, see P. L. Julian, et al., "Heterocyclic Compounds," R. C. Elderfield, Ed., Vol. 3, John Wiley and Sons, Inc., New York, 1952, p. 1, according to the method of R. Robinson et al., described in U.S. Pat. No. 2,407,452, issued Sept. 10, 1946.

The indole precursor (VIII) is then converted to the desired starting material of formula II in which B = B² and $R^2$, $R^3$, $R^4$, $R^5$, $R^{17}$ and $R^{19}$ are as defined in the first instance and Y is hydroxy, mercapto, —$S\text{-}SO_3Na$ or —$S\text{-}SO_3K$.

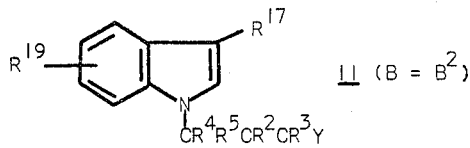

II (B = $B^2$)

This conversion may be effected by several methods. One general method involves reacting the appropriate lithium derivative of the indole precursor (VII) with ethylene oxide or an appropriate lower alkyl substituted ethylene oxide to afford the corresponding desired compound of formula II in which Y is hydroxy. The desired compound is obtained also by treating the appropriate indole precursor (VII) with the appropriate ethylene oxide derivative according to the procedure of M. Julia et al., Bull. Soc. Chim. Fr., 2291 (1966).

The lower alkyl substituted ethylene oxides are prepared by known methods; for example, see V. Franzen and H. E. Driesen, Chem. Ber. 96, 1881 (1963).

Alternative method for the preparation of the requisite starting material of formula II (B = $B^2$) in which $R^2$ and $R^3$ are hydrogen involves treating the indole precursor (VII) with an α-haloacetic acid lower alkyl ester of formula $LCR^4R^5COO$-(lower alkyl) in which L is halo and $R^4$ and $R^5$ are as defined in the first instance, in the presence of a suitable proton acceptor and using preferably an inert solvent for the reaction. The α-haloacetic acid lower alkyl esters are well known, for example see "Rodd's Chemistry of the Carbon Compounds," S. Coffey, Ed., Vol. 1c, 2nd ed., Elsevier Publishing Co., Asterdam, 1965, pp. 201–205. Suitable proton acceptors include sodium hydride, alkali metal carbonates and triethylamine. Suitable inert solvents include tetrahydrofuran, benzene, toluene and dimethylformamide. Preferred conditions for the N-alkylation include the use of sodium hydride as a proton acceptor and N,N-dimethylformamide or tetrahydrofuran as an inert solvent. Although the optimum temperature and reaction time will vary depending on the reactants employed, the reaction is generally performed at the boiling point of the reaction mixture for a period of 30 minutes to 48 hours.

The indole-1-acetic acid lower alkyl ester derivative obtained by the above N-alkylation reaction is thereafter hydrolyzed, preferably with a solution of potassium hydroxide in methanol-water, to give the corresponding indole-1-acetic acid derivative which on reduction with lithium aluminum hydride affords the desired starting material of formula II (B = $B^2$) in which $R^2$ and $R^3$ are hydrogen and Y is hydroxy.

Again alternatively, the latter indole-1-acetic acid derivative may also be reacted with two equivalents of a lower alkyl Grignard reagent, for example, methyl magnesium bromide, to give, after hydrolysis of the magnesium-halogen derivative, the corresponding desired compound of formula II ($R^2=R^3=$ lower alkyl and Y = hydroxy), see L. F. Fieser and M. Fieser, "Advanced Organic Chemistry," Reinhold Publishing Corp., New York, 1961, p. 272.

When the corresponding starting materials of formula II (B = $B^2$) in which $X^1$ is mercapto, —$S\text{-}SO_3Na$ or -$S\text{-}SO_3K$ are desired, a procedure similar to that described by N. N. Suvorov and V. N. Buyanov, cited above, is employed. More particularly, the instant starting material of formula II (B = $B^2$) in which Y is hydroxy is treated with phosphorus tribromide in an inert solvent, for example, ether or carbon tetrachloride, followed by treatment of the product with sodium or potassium thiosulfate to afford the corresponding sodium or potassium β-(1-indolyl)ethyl thiosulfate derivative, respectively, namely the desired starting material of formula II (Y = —$S\text{-}SO_3Na$ or -$S\text{-}SO_3K$) wherein B = $B^2$. Treatment of the latter product with strong alkali, for example, sodium or potassium hydroxide, yields the corresponding bis-[ω-(indolyl)ethyl]disulfide derivative. Finally, reduction of the latter compound with lithium aluminum hydride gives the desired starting material of formula II in which Y is mercapto.

Alternatively, the preceding thiosulfate derivative is treated with acid, for example, dilute aqueous solutions of hydrochloric acid, sulfuric acid or phosphoric acid, to give directly the latter compound of formula II.

Alternatively, the latter starting materials of formula II in which $R^2$ and $R^3$ are hydrogen and Y is mercapto are prepared by oxidizing the corresponding compound of formula II in which Y is hydroxy, described above, with N,N-dicyclohexylcarbodiimide and dimethyl sulfoxide in the presence of a suitable acid, for example, trifluoroacetic acid, see K. E. Pfitzner and J. G. Moffat, J. Amer. Chem. Soc., 87, 5670 (1965), to give the corresponding aldehyde derivative. The same aldehyde derivative is obtained also by N-alkylation of the appropriate indole precursor VII with an appropriate α-haloacetaldehyde derivative (see "Rodd's Chemistry of the Carbon Compounds", cited above, Vol. 1c, pp. 24-26) according to the conditions described above for N-alkylation with α-haloacetic acid lower alkyl esters.

The latter aldehyde derivative is converted to its corresponding gem-dithiol derivative with hydrogen sulfide, which is reduced with lithium aluminum hydride, according to the method of T. L. Cairns, et al., J. Amer. Chem. Soc., 74, 3982 (1952), to yield the desired starting material of formula II in which B is $B^2$, $R^2$ and $R^3$ are hydrogen and Y is mercapto.

It should be noted here also that the preceding processes may not be entirely practical for the preparation of the compounds of formula II in which Y is hydroxy, mercapto, —$S\text{-}SO_3Na$ or —$S\text{-}SO_3K$ and $R^{19}$ is hydroxy or lower alkanoyloxy. For this reason, the preferred indole precursors (VII) for the ultimate preparation of the compounds of formula I in which $R^{19}$ is hydroxy or lower alkanoyloxy are those of formula VII in which $R^{19}$ is benzyloxy, i.e. a hydroxyl with a protecting benzyl group or other suitable protecting group (see J. F. W. Mc Omie, "Advances in Organic Chemistry," Vol. 3, R. A. Raphael, et al., Ed., Interscience Publishers, New York, 1963, pp. 191–294). After the appropriate transformations described below, the benzyloxy group is removed by hydrogenation, in the presence of a catalyst, for example, 10 percent palladium on carbon, just prior to affording the desired corresponding compound of formula I in which $R^{19}$ is hydroxy. The latter may be converted if desired to the corresponding compound of formula I in which $R^{19}$ is lower alkanoyloxy by conventional means, for example, by treatment with the appropriate lower alkanoic anhydride preferably in the presence of pyridine.

Thirdly, the requisite starting materials of formula II in which B = $B^3$ are either known or prepared readily. More specifically, this starting material of formula II, indene-3-ethanol (II; B = $B^3$, $X^1$ = OH and $R^2$, $R^3$, $R^4$, $R^5$, $R^{18}$ and $R^{19}$ = H), is well known and its synthesis by a variety of methods has been reported; for example, see G. R. Clemo et al., J. Chem. Soc., 863 (1951), and F. H. Howell and D. A. H. Taylor, J. Chem. Soc., 3011 (1957). For the preparation of this starting material as well as the other requisite starting materials of formula II (B = B³) in which X¹ is hydroxy the following two general processes are convenient:

The first process for the instant requisite starting material of formula II is illustrated as follows:

to its corresponding lithium derivative by treatment with butyl lithium in tetrahydrofuran. The corresponding lithium derivative is then treated with ethylene oxide or a lower alkyl substituted ethylene oxide of formula XIII to afford the desired starting material of formula II in which Y is hydroxy. The desired starting materials may also be obtained by treating the appropriate indene derivative of formula XII with the appropriate

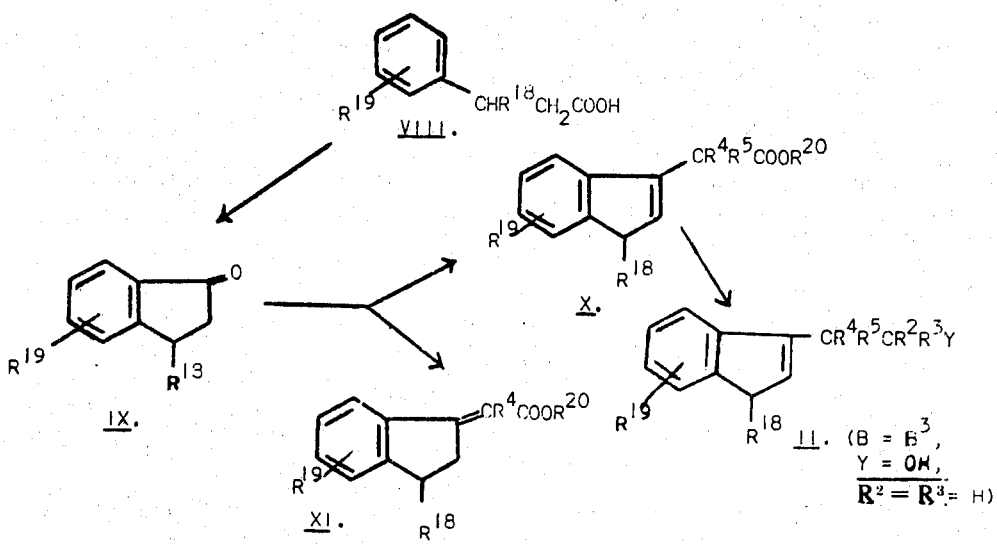

With reference to this first process the cyclization of the appropriate phenylpropionic acid derivative (VIII), see "Chemistry of Carbon Compounds," Vol. III A, E. H. Rodd, Ed., Elsevier Publishing Co., Amsterdam, 1954, pp. 593–598, is accomplished by treatment with an acid, for example, anhydrous hydrofluoric acid, according to the conditions described by J. A. Elvidge and R. G. Foster, J. Chem. Soc., 590 (1963), to give the corresponding indanone of formula IX. The latter compound is treated with the appropriate Reformatskii reagent of formula LCR⁴R⁵COOR²⁰ in which L is bromine or chlorine, R²⁰ is lower alkyl and R⁴ and R⁵ are as defined hereinbefore, followed by dehydration of the product, see "Organic Reactions", Vol. I, R. Adams et al., Eds., John Wiley and Sons, Inc., New York, 1942, p. 1 and K. Brewster et al., J. Chem. Soc., 941 (1972), to give the "endo" ester X or a mixture thereof with the "exo" ester XI in the case where R⁵ is hydrogen. The ester X or the mixture of the latter esters are then reduced by lithium aluminum hydride and the desired compound of formula II (B = B³, X = OH and R² and R³ = H) separated from the reaction product by conventional means such as chromatography or recrystallization.

The second process for the instant requisite starting material of formula II is illustrated as follows:

ethylene oxide derivative (XIII) according to the procedure of M. Julia et al., Bull. Soc. Chim. Fr., 2291 (1966), for reacting ethylene oxide with indole.

The lower alkyl substituted ethylene oxides are prepared by known methods; for example, see V. Franzen and H. E. Driesen, Chem. Ber., 96, 1881 (1963).

The starting materials of formula II in which Y is mercapto, —S-SO₃Na or —S-SO₃K and B is B³ are obtained by the following process: The appropriate compound of formula II (B = B³ and Y = OH), described above, is treated with phosphorus tribromide in an inert solvent, for example, ether or carbon tetrachloride, to afford the corresponding 3-(2-bromoethyl)indene derivative. In the case where Y is hydroxy and R¹, R², R³, R⁴, R⁵, R¹⁸, and R¹⁹ are hydrogen, the corresponding 3-(2-bromoethyl)indene derivative obtained is 3-(2-bromoethyl)indene itself, also described by R. Clemo, et al., 863 (1951). The 3-(2-bromoethyl)indene derivative so obtained is then converted to the remaining desired starting material of formula II by a procedure similar to that described by N. N. Suvorov and V. N. Buyanov, Khim.-Farm. Zh., 1, (1967), [Chem. Abstr. 67, 73474a, (1967)], for converting 3-(2-bromoethyl)-indole to indole-3-ethanethiol. Accordingly, the appropriate 3-(2-bromoethyl)indene derivative is treated with sodium and potassium thiosulfate to afford the

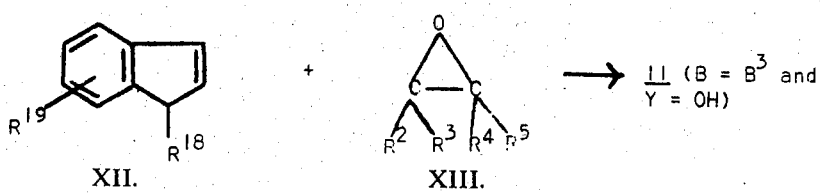

With reference to this second process the appropriate indene derivative of formula XII, see "Chemistry of the Carbon Compounds", Vol. III B, cited above, 1956, pp. 1256-1261, A. Panetta and S. C. Bunce, J. Org. Chem., 4859 (1961), and M. L. Tamayo and N. D. Robles, Anales Real Soc. Espan. Fis. Y Quim., 52B, 117 (1956), [Chem. Abst., 50, 14676 (1956)], is converted corresponding sodium or potassium β-(3-indenyl)ethyl thiosulfate derivative, respectively; namely, the desired starting materials of formula II in which B is B³ and Y is —S-SO₃Na or —S-SO₃K. Subsequent treatment of the latter derivative with strong alkali for example, sodium or potassium hydroxide, transforms the derivative into the corresponding bis-[ω-(3-indenyl)ethyl]disulfide derivative. Reduction of the latter compound with lithium aluminum hydride gives the corresponding desired compound of formula II (B = B³ and Y = SH).

Alternatively, the preceding thiosulfate derivative is treated with acid, for example, dilute aqueous solutions of hydrochloric acid, sulfuric acid or phosphoric acid, to give directly the latter compound of formula II.

Again, it should be noted that the preceding process may not be entirely practical for the preparation of the compounds of formula II in which Y is mercapto and $R^{19}$ is hydroxy or lower alkanoyloxy. For this reason, the preferred starting materials of formula II for the ultimate preparation of the compounds of formula I in which $R^{19}$ is hydroxy or lower alkanoyloxy and X is thio are the corresponding compounds of formula II in which $R^{19}$ is benzyloxy, i.e. a hydroxyl with a protecting benzyl group or other suitable protecting group, see J. F. McOmie, cited above.

When the latter compounds are used as starting materials in this manner, they are first subjected to the process (II + III → I), described below. Subsequently, the benzyloxy group is removed by hydrogenation, in the presence of a catalyst, for example, 10% palladium on carbon, just prior to affording the desired corresponding compound of formula I in which $R^{19}$ is hydroxy. The latter is converted if desired to the corresponding compound of formula I in which $R^{19}$ is lower alkanoyloxy by conventional means, for example, by treatment with the appropriate lower alkanoic anhydride preferably in the presence of pyridine.

Likewise, it should be noted that similar use of the starting materials of formula II (B = B³) in which Y is hydroxy and $R^{19}$ is benzyloxy to obtain the corresponding compound of formula I in which $R^{19}$ is hydroxy or lower alkanoyloxy is also preferred.

The compound of formula III also required for the practice of this invention are aminoketones of formula $R^1CO-Alk-NR^6R^7$ in which $R^1$, Alk, $R^6$ and $R^7$ are as defined in the first instance. These requisite aminoketones are either known, for example, 4-(dimethylamino)-2-butanone, 1-methylamino-3-pentanone, see F. F. Blicke, cited above, or they may be prepared by known procedures, for example, see "Methoden der Organic Chemie," cited above, Vol. XI/I, 1957, pp. 58–62, 285–289 and 508–509.

In practising this present process for the preparation of compounds of formula I, it is generally advantageous to utilize substantially equimolar amounts of the starting material of formula II and the aminoketone compound of formula III in the presence of an acid catalyst.

The use of a solvent as a reaction medium for the present condensation is not critical. Toluene, o-xylene or isobutyl ether, may be used; however, the solvent may be omitted without detrimental effects on the reaction if the reactants are heated to a melt and stirred. Preferably in this latter case the reaction is performed in an inert atmosphere, for example, under nitrogen or helium.

A variety of suitable acid catalysts may be used for this condensation, for example, the type of catalyst used in a Friedel-Crafts reaction, i.e., p-toluenesulfonic acid, aluminum chloride, phosphorus pentoxide, polyphosphoric acid, boron trifluoride, zinc chloride, hydrochloric acid, perchloric acid, trifluoroacetic acid, sulfuric acid, and the like. Boron-trifluoride, p-toluenesulfonic acid, aluminum chloride and phosphorus pentoxide are included among the preferred acid catalysts. The amount of the aforementioned acid catalyst employed ranges generally from about 1.01 to 100 molar equivalents with respect to the amount of aminoketone reactant, a range of from 1.05 to 10 molar equivalents being preferred. Optionally, one may employ the acid addition salts of the aforementioned aminoketones, for example the hydrochloride or the sulfate salt. In this case the amount of acid catalyst to employ may range from 0.01 to 100 molar equivalents, preferably 0.1 to 10 molar equivalents.

Reaction time and temperature depends on the particular reactants employed and may be varied. The most convenient reaction time is usually from ½ to 48 hours, preferably one-half to four hours and reaction temperatures from 20° to 200°C, preferably 60° to 140°C. The reaction is each individual case is performed preferably at the lowest temperature at which the reaction proceeds smoothly and expeditiously with a minimum of decomposition.

In the case where the starting material is one of formula II in which Y is —S-SO₃Na or —S-SO₃K, it is preferable to have at least one equivalent of water present in the reaction mixture. This water may be added directly to the reaction or it may be included as part of the acid catalyst. Examples of the latter instance would be when p-toluenesulfonic acid containing water of crystallization or concentrated hydrochloric acid are employed as the acid catalyst.

In a related aspect of this invention is will be apparent to those skilled in the art that $R^{19}$ may represent more than one and as many as four such substituents on the benzene portion of the radicals $A^1$, $A^2$ or $A^3$ of the aforementioned compounds of formula I or on the benzene portion of the radicals $B^1$, $B^2$, or $B^3$ of the aforementioned compounds of formula II, provided that any two such substituents do not interfere with each others presence. Such compounds are capable of being prepared by the process of this invention and their process of preparation is included within the scope of this invention. For an example of such compounds of formula II required for the preparation of the corresponding compounds of formula I, reference is made to co-pending U.S. Application, Ser. No. 289,714 filed September 15, 1972 which discloses the preparation of compounds of formula II in which B is the radical

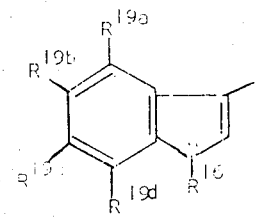

in which $R^{16}$ is as defined hereinbefore and $R^{19a}$, $R^{19b}$, $R^{19c}$ and $R^{19d}$ are the same or different selected from the group consisting of hydrogen, lower alkyl, hydroxy, lower alkoxy, benzyloxy, lower alkanoyloxy or halo.

The following examples illustrate further this invention.

EXAMPLE 1

3-Methylindole-1-ethanol (11:B = B², R², R³, R⁴, R⁵ and $R^{19}$ = H, $R^{17}$ = $CH_3$ and Y = OH)
Procedure A:

Commercial n-butyl lithium in hexane (3.05 mole) is diluted with 1000 ml of dry tetrahydrofuran (THF). To this cooled (−10° to 0°C) solution the starting material of formula II, skatole (393 g, 3.0 mole) in 1000 ml of dry THF, is added dropwise. The reaction is stirred at the same low temperature for 1 hour and then 300 ml of ethylene oxide in 300 ml of dry THF is added to the mixture. The temperature of the reaction is allowed to rise to room temperature and at this temperature the reaction is stirred overnight.

THF is evaporated and the residue is dissolved in methylene chloride and washed concentrated HCl. The methylene chloride solution is then washed with 10 percent sodium bicarbonate, water and dried ($MgSO_4$). The solvent is evaporated and the product distilled at reduced pressure to give the title compound, b.p. 124°C/0.25 mm.

Procedure B:

The starting material of formula II, skatole (35 g, 0.276 mole) in 300 ml of dimethylformamide (DMF) is added dropwise to stirred mixture of sodium hydride (14.0 g, 55% oil dispension) in 325 ml of DMF. The mixture is heated at 40°C for 2 hours. After cooling in an ice-water bath ethyl bromoacetate (116.5 g, 0.7 mole) is added dropwise keeping the temperature below 20°C. After the addition, stirring is continued for five minutes, and then water added cautiously to destroy any excess hydride. The reaction mixture is partitioned between water and ether, the ether layer washed with water, dried ($MgSO_4$) and evaporated under reduced pressure.

The residue, 3-methyl-indole-1-acetic acid ethyl ester, is dissolved in 900 ml of methanol, potassium hydroxide (90 g) in 400 ml of 1:1 methanol-$H_2O$ is then added. The mixture is stirred at room temperature for 1½ hours. The methanol is evaporated under reduced pressure. The residue is diluted with water (800 ml) and extracted ($3x$) with ether. Acidification with 6NHCl of the aqueous phase yields 3-methyl-indole-1-acetic acid, m.p. 174°–176°C.

The latter compound (47.5 g., 0.25 mole) in 1000 ml of ether is slowly added to a stirred mixture of lithium aluminum hydride (12.5 g) (0.32 moles) in 700 ml of ether. The reaction is kept below 15°C using an ice-water bath. The reaction is stirred for fifteen minutes after the addition, the excess hydride destroyed with water, and the precipitate collected. The ether filtrate is washed with water, dried over sodium sulfate and evaporated under reduced pressure to afford an oil. Chromatography on silica gel using 15% ethylacetate in benzene as eluant gives the title compound, identical with the product of procedure A.

By following the procedure A of Example 1 other indole-1-ethanol intermediates of formula II for example those listed in Examples 81 to 92, may be prepared by the appropriate choice of the indole precursor of formula VII and ethylene oxide derivative. For example, by replacing skatole and ethylene oxide with equivalent amounts of 3,7-dimethylindole, R. Robinson et al., cited above, and 3,3-dimethyl-1,2-epoxybutane, V. Franzen and H. E. Driesen, cited above, respectively, a mixture of β-isopropyl-α,3,7-trimethyl-indole-1-ethanol and α-isopropyl-β,3,7-trimethyl-indole-1-ethanol, are obtained. Such mixtures of positional isomers may be separated by fractional distillation, fractional recrystallization or chromatography. Likewise, the replacement of skatole with 3-isopropylindole, R. Robinson et al. cited above, in procedure A of Example 1 yields 3-isopropylindole-1ethanol.

By following procedure B of Example 1 other indole-1-ethanol intermediates of formule II in which $R^2$ and $R^3$ are hydrogen may be prepared by the appropriate choice of the precursor of formula VII and α-haloacetic acid lower alkyl ester of formula $LCR^4R^5COO$-(lower alkyl) in which L is halo and $R^4$ and $R^5$ are hydrogen or lower alkyl. For example, by replacing skatole and ethyl bromoacetate with equivalent amounts of 3-ethylindole, R. Robinson et al., cited above, and ethyl 2-bromopropionate, respectively, α-methyl-3-ethyl-indole-1-ethanol is obtained. Likewise the replacement of skatole with 3-butylindole, R. Robinson et al., cited above, in the procedure B of Example 1 yields 3-butylindole-1-ethanol.

EXAMPLE 2

3-Methylindole-1-ethanethiol(II; B = $B^2$, $R^2$, $R^3$, $R^4$, $R^5$ and $R^{19}$ = H, $R^{17}$ = $CH_3$ and Y = SH)

Procedure A:

N,N-dicyclohexylcarbodiimide (9.0 g) is added to a cooled, stirred solution of 3-methylindole-1-ethanol (3.0 g) in 30 ml of dimethyl sulfoxide benzene-(2:1) containing trifluoroacetic acid (0.6 ml) and pyridine (1.12 ml). The reaction is stirred at room temperature under nitrogen for 5 hours. The reaction mixture is now diluted with 300 ml of ether, followed by the dropwise addition of a solution of oxalic acid (3.78 g) in 11 ml of methanol. After thirty minutes, water (300 ml) is added and the insoluble material is collected. The organic phase is washed with water ($2x$), 5 percent aqueous sodium bicarbonate ($2x$) and water ($2x$). After drying ($MgSO_4$) the organic phase is evaporated to yield 3-methylindole-1-acetaldehyde. The latter compound is then converted to its corresponding gem-dithiol with hydrogen sulfide and reduced with lithium aluminum hydride according to the method of T. L. Cairns et al., J. Amer. Chem. Soc., 74, 3982 (1952), to yield the title compound, $\lambda_{max}^{CHCl_3}$ $CHCl_{3\,max}$ 2570 $cm^{-1}$.

Procedure B:

To a stirred solution of 7.2 g of 3-methylindole-1-ethanol, described in Example 1, in 500 ml. of dry ether (ice bath) is slowly added 1.2 ml of phosphorus tribromide in 100 ml of dry ether. A dark red oily complex separates. The reaction mixture is stirred 36–48 hours at room temperature, then decomposed with ice and water. The separated ether layer is quickly washed with a 10 percent solution of sodium bicarbonate and with water again, dried over calcium chloride for 2 min., decanted, and dried over magnesium sulfate for 30 min. The filtrate is evaporated yielding 1-(2-bromoethyl)-3-methylindole.

A solution of 10.4 g. of sodium thiosulfate in 60 ml. of water and 100 ml. of ethanol is poured onto 8.6 g. of 1-(2-bromoethyl)-3-methylindole. The reaction mixture is stirred and heated at reflux for 3.5 hr., allowed to cool, and evaporated to dryness. The solid residue is dissolved in boiling isopropanol, dried with a hydrated alkali-aluminum silicate ("Molecular Sieves"), and filtered. Chilling of the filtrate causes 6.4 g. of the sodium 3-methylindole-1-ethyl thiosulfate (II; B = $B^2$, $R^2$, $R^3$, $R^4$, $R^5$ and $R^{19}$ = H, $R^{17}$ = $CH_3$ and Y = -$S$-$SO_3Na$) to precipitate. This material is collected by filtration and washed with ether. The isolated intermediate is heated at reflux with a solution of sodium hydroxide (9 g. of NaOH, 60 ml. of water, 140 ml. of ethanol) for 3 hr. Ethanol is removed under reduced pressure, the aqueous residue diluted with water and extracted with three portions of ether. Combined ether extracts are washed with water, saturated brine solution, and dried over magnesium sulfate. The filtrate is evaporated, to yield bis-[2-(3-methylindole-1-yl)ethyl]disulfide.

The latter product (1.4 g.) in 100 ml. of dry ether is dropped into a stirred suspension of 600 mg. $LiAlH_4$ in 80 ml. of dry ether. The reaction mixture is heated to reflux for 3 hr. and then kept for 15 hr. at room temperature. Decomposition with 2.8 ml. of water is carried out in a stream of nitrogen. After 60 min. of stirring, a white precipitate is filtered off with suction, the cake is washed with ether, and the filtrate dried over magnesium sulfate. The clear ether solution is evaporated to give the title compound.

By following procedure A or B of Example 2 other indole-1-ethanethiol intermediates of formule II for example those descrribed in Examples 112 to 123 my be prepared by the appropriate choice of the indole precursor of formula VII. For example, by replacing 3-methylindole-1-ethanol with an equivalent amount of β-isopropyl-α,3,7-trimethylindole-1-ethanol, β-isopropyl-α,3,7-trimethyl-indole-1-ethanethiol is obtained. Likewise, by replacing 3-methylindole-1-ethanol with an equivalent amount of 3-isopropylindole-1-ethanol, 3isopropylindole-1-ethanethiol is obtained.

EXAMPLE 3

Indene-3-ethanethiol (II; B = $B^3$, $R^2$, $R^3$, $R^4$, $R^5$, $R^6$, $R^{18}$ and $R^{19}$ = H and Y = SH)

3-(2-Bromoethyl)-indene (17 g), prepared from indene-3-ethanol in a procedure analogous to Example 2, Procedure B, is subjected to reflux for 3 hours with a solution of 13.3 g of sodium thiosulfate in 100 ml of water and 200 ml of ethanol. The solvents are removed under reduced pressure to give the corresponding sodium indeneethyl thiosulfate derivative (II; B = $B^3$, $R^2$, $R^3$, $R^4$, $R^5$, $R^{18}$ and $R^{19}$ = H and Y = -S-$SsO_3$Na). The latter derivative is dissolved in a solution of NaOH (15 g) in 100 ml of water. Ethanol (300 ml is added). The solution is heated under reduced pressure, and the residue dissolved in a solution of NaOH (15 g) in 100 ml of water. Ethanol (300 ml is added). The solution is heated to reflux for 2 hr., allowed to cool, and extracted with three portions of ether. The combined extracts are -S- with saturated brine solution, and concentrated. The residue is passed through a column packed with silica gel and eluted with benzene-hexane (1:3) to yield bis-[ω-(3-indenyl)ethyl]disulfide, nmr (CDCl$_3$): δ 3.02 (s, 8H), 3.33 (m, 4H), 6.25 (m, 2H), 7.30 (m, 8H), as an oil. The latter compound (12 g) in anhydrous ether is added dropwise with efficient stirring to a suspension of lithium aluminium hydride (2.5 g) in ether (200 ml). The reaction mixture is stirred at room temperature overnight, decomposed with 10 ml of water, and the precipitate collected on a filter. The filtrate is dried (MgSO$_4$). Evaporation of the solution gives the title compound, nmr (CDCl$_3$) δ 1.48 (+, 1H), 2.83 (m, 4H), 3.32 (m, 2H), 6.25 (m, 1H), 7.30 (m, 4H).

By following the procedure of this example other starting materials of formula II (B = $B^3$ and Y = SH or -S-SO$_3$-Na), for example those described in Examples 160 to 169, are prepared by the appropriate choice of the appropriately subsituted 3-(2-bromoethyl)-indene derivative. The latter derivative is prepared from their corresponding starting material of formula II (B = $B^3$ and $X^1$ = OH) by treatment with phosphorus tribromide in carbon tetrachloride.

For example, by replacing 3-(2-bromoethyl)-indene in the procedure of this example with an equivalent amount of 3-(2-bromoethyl)-5-methoxyindene, 5-methoxyindene-3-ethanethiol is obtained. Likewise, by replacing 3-(2-bromoethyl)-indene with 3-(2-bromo-1-methylpropyl)-indene, α,β-dimethyl-indene-3-ethanethiol is obtained.

EXAMPLE 4

1-[(2-Dimethylamino)ethyl]-1-methyl-1,3,4,9-tetrahydropyrano[3,4-b]indole (I; A = $A^1$, $R^1$ = CH$_3$, $R^2$, $R^3$, $R^4$, $R^5$, $R^{16}$ and $R^{19}$ = H, X = O, Alk = CH$_2$CH$_2$ and $R^6$ and $R^7$ = CH$_3$)

To a solution of p-toluenesulfonic acid (2.28 g) in toluene (40 ml), the starting material of formula II, tryptophol (1.61 g), and the aminoketone, 4-(dimethylamino)-2-butanone (1.27 g) are added. The mixture is evaporated under reduced pressure and the residue stirred under nitrogen at 130°C (bath temperature) for 45 min.. The mixture is cooled, water (20 ml) added and the mixture extracted with toluene. The toluene extract is washed with 5% sulfuric acid (5 ml) and with water (5 ml). The aqueous layer containing a dark heavy oil is combined with the aqueouus washes. Conc. NH$_4$OH (10 ml) is added and the mixture extracted with toluene (10 ml and 2 × 5 ml). The combined toluene solution is washed with water (2 × 5 ml), dried (Na$_2$SO$_4$), treated with charcoal and evaporated under reduced pressure. The residue is recrystallized from ether to afford the pure title compound, m.p. 133°-135°C, nmr (CDCl$_3$) δ 1.53 (s, 3H), 2.07 (2H), 9.74 (1H), 10.55 (5H).

The corresponding oxalic acid addition salt (oxalate), 1-[(2-dimethylamino)ethyl]-1-methyl-1,3,4,9-tetrahydropyrano[3,4-b]indole oxalate, has m.p. 181°-183°C. after crystallization from methanol-ether.

EXAMPLE 5

1,9-Dimethyl-1-[2-dimethylamino)ethyl]-1,3,4,9-tetrahydropyrano[3,4-b]indole (I; A = $A^1$, $R^1$ and $R^{16}$ = CH$_3$, $R^2$, $R^3$, $R^4$, $R^5$ and $R^{19}$ = H, X = O, Alk = CH$_2$CH$_2$ and $R^6$ and $R^7$ = CH$_3$)

To a mixture of the starting material of formula II, N-methyltryptophol (0.50 g), and the aminoketone, 4-dimethylamino-2-butanone (0.363 g), p-toluene-sulfonic acid (0.650 g) is added in portions and the mixture stirred under nitrogen at 130°C for 1 1/2 hr. After cooling water is added (10 ml) and the mixture is extracted with toluene (2 × 5 ml). The combined toluene solution is backwashed with water and discarded. The aqueous phase, containing a heavy brown oil, is made alkaline with conc. ammonium hydroxide (10 ml) and extracted with benzene (3 × 10 ml). The combined benzene extract is washed with water (2 × 10 ml), dried (Na$_2$SO$_4$), treated with charcoal and evaporated under reduced pressure to yield the title compound, nmr (CDCl$_3$) δ 1.66 (3H), 2.70 (6H), 3.83 (3H).

The corresponding hydrochloric acid addition salt, 1,9-dimethyl-1-[2-(dimethylamino)ethyl]-1,3,4,9-tetrahydropyrano-[3,4-b]indole hydrochloride, has m.p. 229°-230°C. after crystallization from methylene dichloride-benzene.

The procedure of Examples 4 or 5 are followed to prepare other compounds of formula I in which A is $A^1$, X is oxy and $R^1$, $R^2$, $R^3$, $R^4$, $R^5$, $R^6$, $R^7$, $R^{16}$, $R^{19}$ and Alk are as defined in the first instance. Examples of such compounds of formula I are listed in Table 1. In each of these examples an equivalent amount of the respective starting material of formula II and the aminoketone of formula III, listed therein, is used instead of the starting material of formula II and the aminoketone employed in Examples 4 and 5.

TABLE I

| Ex. | Starting Material of Formual II (B = B¹) | | | | | | | Aminoketone | Product: (Prefix Listed Below)-1,3,4,9-tetrahydro-pyrano[3,4-b]indole |
|---|---|---|---|---|---|---|---|---|---|
| | $R^2$ | $R^3$ | $R^4$ | $R^5$ | $R^{16}$ | $R^{19}$ | Y | | |
| 6 | H | H | H | H | H | H | OH | 4-amino-2-butanone | 1-(2-aminoethyl)-1-methyl, m.p. 80 – 84°C. |
| 7 | H | H | H | H | H | H | OH | 4-piperidino-2-butanone | 1-methyl-1-(2-piperidino-ethyl), m.p. 146 – 148°C., m.p. of corresponding maleic acid addition salt, 147 – 149°C. |
| 8 | $CH_3$ | $CH_3$ | H | H | H | 5—$CH_3O$ | OH | 1-(diethyl-amino)-2-propanone | 1-[(diethylamino)methyl]-6-methoxy-1,3,3-trimethyl |
| 9 | H | H | H | H | H | 4—$C_2H_5$ | OH | 2-piperidino-3-pentanone | 1,5-diethyl-1-(1-piperidino-ethyl) |
| 10 | H | H | H | H | H | H | OH | 4-(methyl-amino)-2-butanone | 1-methyl-1-[2-(methylamino)-ethyl], m.p. 160 – 163°C., m.p. of corresponding oxalic acid addition salt, 140 – 144°C. |
| 11 | H | H | H | H | H | H | OH | 4-(1-pyrroli-dinyl)-2-butanone | 1-methyl-1-[2-(1-pyrrolidin-yl)ethyl], nmr (CDCl₃) δ 1.62 (3H), 2.00 (m, 4H), 4.05 (m, 2H), m.p. of corresponding maleic acid addition salt 192 – 193°C. |
| 12 | H | H | H | H | H | H | OH | 4-morpho-lino-2-butanone | 1-methyl-1-(2-morpholino-ethyl), nmr (DMSO-d₅) δ 1.50 (3H), 6.07 (2H), m.p. of corresponding maleic acid addition salt, 192 – 193°C. |
| 13 | H | H | H | H | H | H | OH | 4-(4-methyl-1-piperazin-yl)-2-butanone | 1-methyl-1-[2-(4-methyl-1-piperazinyl)ethyl], nmr (CDCl₃) 1.47 (3H), 2.58 (3H), [m.p. of corresponding maleic acid addition salt (dimaleate), 208 – 210°C. |
| 14 | H | H | H | H | H | H | OH | 5-(methyl-amino)-2-pentanone | 1-methyl-1-[3-(methylamino)-propyl], nmr (CDCl₃) δ 1.48 (3H), 1.87 (4H), corresponding oxalic acid addition salt has m.p. 110°C. |
| 15 | H | H | H | H | H | H | OH | 5-(dimethyl-amino)-2-pnetanone | 1-methyl-1-[3-(dimethyl-amino)propyl], m.p. 116°C., corresponding oxalic acid addition salt has m.p. |
| 16 | H | H | H | H | H | H | OH | 1-amino-2-propane | 1-(aminomethyl)-1-methyl, $\nu_{max}^{CHCl_3}$ 3465, 3400, 3180, 2930, corresponding hydrochloric acid addition salt (hydrochloride) has m.p. 251 – 252°C. |
| 17 | H | H | H | H | H | H | OH | 1-ethyl-amino-2-propanone | 1-[(ethylamino)methyl]-1-methyl, nmr (DMSO-d₆) δ1.18 (3H), 1.62 (3H), 2.80 (2H); corresponding hydrochloric acid addition salt has m.p. 242 – 243°C. |
| 18 | H | H | H | H | H | H | OH | 1-(diethyl-amino)-3-hexanone | 1-[2-(dimethylamino)ethyl]-1-propyl, nmr (CDCl₃) δ 0.84 (+, 3H), 1.21 (3, 6H), 2.79 (+, J = 5.5 cps, 2H) corresponding maleic acid |

TABLE I-continued

| Ex. | Starting Material of Formual II (B = B¹) | | | | | | | Aminoketone | Product: (Prefix Listed Below)-1,3,4,9-tetrahydro-pyrano[3,4-b]indole |
|---|---|---|---|---|---|---|---|---|---|
| | $R^2$ | $R^3$ | $R^4$ | $R^5$ | $R^{16}$ | $R^{19}$ | Y | | |
| 19 | H | H | H | H | H | H | OH | 5-(1-pyrro-lidinyl)-2-pentanone | addition salt has m.p. 152 – 154°C) 1-methyl-1-[3-(1-pyrrolidin-yl)propyl], m.p. 124 – 127°C. |
| 20 | H | H | H | H | $CH_3$ | 4—$CH_3$ | OH | 4-(dimethyl-amino)-2-butanone | 1-[2-(dimethylamino)ethyl]-1,5,9-trimethyl, nmr ($CDCl_3$) δ 1.63 (s, 3H), 2.20 (s,6H), 2.67 (s, 3H), 3.74 (s, 3H), corresponding maleic acid addition salt has m.p. 144–145°C. |
| 21 | H | H | H | H | $CH_3$ | 5—$OCH_3$ | OH | 4-(dimethyl-amino)-2-butanone | 1,9-dimethyl-1-[2-(dimethyl-amino)ethyl]-6-methoxy, nmr ($CDCl_3$) δ 1.66 (s, 3H), 3.87 (s, 3H), corresponding maleic acid addition salt has m.p. 109 – 111°C. |
| 22 | H | H | H | H | $CH_3$ | 4—Cl | OH | 4-(dimethyl-amino)-2-butanone | 5-chloro-1,9-dimethyl-1-[2-(dimethylamino)ethyl], nmr ($CDCl_3$) δ 1.66 (s, 3H), 2.76 (6H), 3.14 (m, 2H), corresponding maleic acid addition salt has m.p. 149 – 151°C. |
| 23 | H | H | H | H | $CH_3$ | 5—OH | OH | 4-(dimethyl-amino)-2-butanone | 1,9-dimethyl-1-[2-(dimethyl-amino)ethyl]-6-hydroxy, nmr (DMSO-$d_6$) δ 1.58 (3H), 2.56 (6H), 3.72 (3H), corresponding hydrochloric salt has m.p. 242–244°C (dec.). |
| 24 | H | H | H | H | $C_2H_5$ | 5—benz-yloxy | OH | 4-(dimethyl-amino)-2-butanone | 1-[2-(dimethylamino)ethyl]-9-ethyl-6-hydroxy-1-methyl, $\nu_{max}^{CHCl_3}$ 3210, corresponding hydrochloric acid addition salt has m.p. 213 – 214°C. [this product obtained by hydrogenolysis (10% Pd/C) of corresponding 6-benzyloxy hydrochloride derivative, m.p. 216.7°C] |
| 25 | H | H | H | H | $CH_3$ | 5—OAc | OH | 6-(dimethyl-amino)-2-hexanone | 6-acetoxy-1-[4-(dimethyl-amino)butyl]-1,9-dimethyl |
| 26 | H | H | H | H | H | 5—$OCH_3$ | OH | 7-(1-pyrro-lidinyl)-3-heptanone | 1-ethyl-6-methoxy-1-[4-(1-pyrrolidinyl)butyl] |
| 27 | H | H | H | H | $CH_3$ | H | OH | 4-(diethyl-amino)-2-butanone | 1-[2-(diethylamino)ethyl]-1,9-dimethyl, nmr ($CDCl_3$) δ 0.94 (+, 6H), 1.06 (s, 3H) |
| 28 | H | H | H | H | $C_2H_5$ | H | OH | 1-(dimethyl-amino)-3-pentanone | 1-[2-(dimethylamino)ethyl]-9-ethyl-1-methyl, nmr ($CDCl_3$) δ 1.39 (3H), 1.70 (3H), 2.73 (m, 12H), corresponding hydrochloric acid addition salt has m.p. 202 – 205°C. |
| 29 | H | H | H | H | n—$C_3H_7$ | H | OH | 1-(dimethyl-amino)-3-hexanone | 1-[2-(dimethylamino)ethyl]-1-methyl-9-propyl, nmr ($CDCl_3$), δ 1.00 (+, 3H), 1.65 (s, 3H), corresponding maleic acid addition salt has m.p. 125 – 126°C. |
| 30 | H | H | H | H | $CH_3$ | H | OH | 5-(dimethyl-amino)-2-pentanone | 1,9-dimethyl-1-[3-(dimethyl-amino)propyl], nmr ($CDCl_3$) δ 1.60 (3H), 2.68 (6H), corresponding maleic acid addition salt has m.p. 115 – 118°C. |
| 31 | H | H | H | H | $CH_3$ | H | OH | 4-(piperi-dino)-2-butanone | 1,9-dimethyl-1-(2-piperidino-ethyl), nmr ($CDCl_3$ δ 1.61 (s, 3H), 2.32 (m, 6H), 9.81 (m, 2H), m.p. of correspond-ing hydrochloric acid addition salt, 233 – 235°C. |
| 32 | H | H | H | H | $CH_3$ | H | OH | 4-[4-(2-hydroxy-ethyl)-1-piperazinyl] 2-butanone | 1,9-dimethyl-1-{2-[4-(2-hydroxyethyl)-1-piperazinyl] ethyl}, nmr ($CDCl_3$) δ 1.60 (s. 3H), 3.70 (s, 3H), m.p. of corresponding dihydrochloride salt, m.p. 219 – 220°C. |

EXAMPLE 33

1,9-Dimethyl-1-[2-(dimethylamino)ethyl]1,3,4,9-tetrahydrothiopyrano[3,4-b]indole (I; A = A$^1$, R$^1$ and R$^{16}$ = CH$_3$, R$^2$, R$^3$, R$^4$, R$^5$ and R$^{19}$ = H, X = S, Alk = CH$_2$CH$_2$ and R$^6$ and R$^7$ = CH$_3$)

A mixture of 1-methylindole-3-ethanethiol (0.75 g), 4-dimethylamino-2-butanone hydrochloride (0.72 g), toluene (ca. 1ml) and p-toluenesulfonic acid (1.00 g), is stirred under nitrogen at 125°C for ½ hr. After cooling, water (20 ml) and conc. hydrochloric acid (0.5 ml) are added and the mixture is then extracted with toluene (3 × 10 ml). The combined toluene solution is backwashed with water. The aqueous phase containing a brown oil is rendered alkaline with conc. NH$_4$OH and extracted with toluene (3 × 15 ml). The combined toluene solution is washed with water, dried (Na$_2$SO$_4$), treated with charcoal and evaporated under reduced pressure to yield the title compound, nmr (CDCl$_3$) δ 3.72 (s,6H), 6.40 (s,3H).

The procedure of Example 33 is followed to prepare other compounds of formula I in which A is A$^1$, X is thio and R$^1$, R$^2$, R$^3$, R$^4$, R$^5$, R$^6$, R$^7$, R$^{16}$, R$^{19}$ and H, X are as defined in the first instance. Examples of such compounds of formula I are listed in Table II In each of these examples an equivalent amount of the respective starting material of formula II and the aminoletone of formula III, listed therein, is used instead of the starting material of formula II and the aminoketone employed in Example 33.

TABLE II

| Ex. | Starting Material of Formual II (B = B$^1$) | | | | | | Aminoketone | | Product: (Prefix Listed Below)-1,3,4,9-tetrahydro-thiopyrano[3,4-b]indole |
|---|---|---|---|---|---|---|---|---|---|
| | R$^2$ | R$^3$ | R$^4$ | R$^5$ | R$^{16}$ | R$^{19}$ | Y | | |
| 34 | H | H | H | H | H | H | SH | 4-amino-2-butanone | 1-(2-aminoethyl)-1-methyl |
| 35 | H | H | H | H | H | H | SH | 4-piperidino-2-butanone | 1-methyl-1-(2-piperidino-ethyl) |
| 36 | CH$_3$ | CH$_3$ | H | H | H | 5—CH$_3$O | SH | 1-(diethylamino)-2-propanone | 1-[(diethylamino)methyl]-6-methoxy-1,3,3-trimethyl |
| 37 | H | H | H | H | H | 4—C$_2$H$_5$ | SH | 2-piperidino-3-pentanone | 1,5-diethyl-1-(1-piperidino-ethyl) |
| 38 | H | H | H | H | H | H | SH | 4-(methylamino)-2-butanone | 1-methyl-1-[2-(methylamino)-ethyl] |
| 39 | H | H | H | H | H | H | SH | 4-(1-pyrrolidinyl)-2-butanone | 1-methyl-1-[2-(1-pyrrolidinyl)ethyl] |
| 40 | H | H | H | H | H | H | SH | 4-morpholino-2-butanone | 1-methyl-1-(2-morpholino-ethyl) |
| 41 | H | H | H | H | H | H | SH | 4-(4-methyl-1-piperazinyl)-2-butanone | 1-methyl-1-[2-(4-methyl-1-piperazinyl)ethyl] |
| 42 | H | H | H | H | H | H | SH | 5-(methylamino)-2-pentanone | 1-methyl-1-[3-(methylamino)propyl] |
| 43 | H | H | H | H | H | H | SH | 5-(dimethylamino)-2-pentanone | 1-methyl-1-[3-(dimethylamino)propyl] |
| 44 | H | H | H | H | H | H | SH | 1-amino-2-propanone | 1-(aminomethyl)-1-methyl |
| 45 | H | H | H | H | H | H | SH | 1-(ethylamino)-2-propanone | 1-[(ethylamino)methyl]-1-methyl |
| 46 | H | H | H | H | H | H | SH | 1-(diethylamino)-3-hexanone | 1-[2-(dimethylamino)ethyl]-1-propyl |
| 47 | H | H | H | H | H | H | SH | 5-(1-pyrrolidinyl)-2-pentanone | 1-methyl-1-[3-(1-pyrrolidinyl)propyl] |
| 48 | H | H | H | H | H | H | SH | 1-(hexylamino)-3-pentanone | 1-ethyl-1-[2-(hexylamino)-ethyl] |
| 49 | H | H | H | H | H | 6—Cl | SH | 4-(diethylamino)-3-methyl-2-butanone | 7-chloro-1-[2-(diethylamino)-1-methyl-ethyl]-1,4-dimethyl |
| 50 | CH$_3$ | CH$_3$ | H | H | H | 5—OC$_2$H$_5$ | SH | 3-ethyl-3-(hexylaminomethyl)-4-octanone | 1-butyl-1-[1,1-diethyl-2-(hexylamino)ethyl]-3,3-dimethyl-6-ethoxy |
| 51 | C$_2$H$_5$ | H | C$_2$H$_5$ | H | H | 4—I | SH | 2,2-dimethyl-6-(methylamino)-3-hexanone | 3,4-diethyl-5-iodo-1-isopropyl-1-[3-(methylamino)propyl] |
| 52 | H | H | CH$_3$ | CH$_3$ | H | H | SH | 4,4-dimethyl-5-(dimethylamino)-3-methyl-2-pentanone | 1-[3-(dimethylamino)1,2,2-trimethyl-propyl]-1,4,4-trimethyl |
| 53 | H | H | H | H | CH$_3$ | 5—OAc | SH | 6-(dimethylamino)-2-hexanone | 6-acetoxy-1-[4-(dimethylamino)butyl]-1,9-dimethyl |
| 54 | H | H | H | H | H | 5—OCH$_3$ | SH | 7-(1-pyrol- | 1-ethyl-6-methoxy-1-[4- |

TABLE II-continued

| Ex. | Starting Material of Formual II (B = B¹) | | | | | | Aminoketone | Product: (Prefix Listed Below)-1,3,4,9-tetrahydro-thiopyrano[3,4-b]indole |
|---|---|---|---|---|---|---|---|---|
| | $R^2$ | $R^3$ | $R^4$ | $R^5$ | $R^{16}$ | $R^{19}$ | Y | |
| 55 | H | H | H | H | $CH_3$ | H | SH idinyl)-3-heptanone 4-(diethyl-amino)-2-butanone | (1-pyrrolidinyl)butyl] 1-[2-(diethylamino)ethyl]-1,9-dimethyl |
| 56 | H | H | H | H | $C_2H_5$ | H | SH 4-(dimethyl-amino)-2-butanone | 1-[2-(dimethylamino)ethyl]-9-ethyl-1-methyl |
| 57 | H | H | H | H | n—$C_3H_7$ | H | SH 1-(dimethyl-amino)-3-hexanone | 1-[2-(dimethylamino)ethyl]-1,9-dipropyl |
| 58 | H | H | H | H | $CH_3$ | H | SH 5-(dimethyl-amino)-2-pentanone | 1,9-dimethyl-1-[3-(dimethyl-amino)propyl] |
| 59 | H | H | H | H | $CH_3$ | H | SH 4-piperi-dino-2-butanone | 1,9-dimethyl-1-(2-piperi-dinoethyl) |
| 60 | H | H | H | H | $CH_3$ | H | SH 4-[4-(2-hydroxyethyl)-1-piperazin-yl]-2-butanone | 1,9-dimethyl-1-{2-[4-(2-hydroxyethyl)-1-piperazin-yl]ethyl} |

EXAMPLE 61

1,10-Dimethyl-1-[3-(methylamino)propyl]-3,4-dihydro-1H-1,4-oxazino[4,3-a]indole (1; A = A², R¹ and R¹⁷ = CH₃, R², R³, R⁴, R⁵ and R¹⁹ = H, X = O, Alk = CH₂CH₂CH₂, R⁶ = H and R⁷ = CH₃)

To a solution of p-toluenesulfonic acid (2.28 g) in toluene (40 ml), the starting material of formula II, 3-methylindole-1-ethanol (1.6 g), and the aminoketone, 5-(methylamino)-2-pentanone (1.3 g), are added. The mixture is evaporated under reduced pressure and the residue stirred under nitrogen at 130°C (bath temperature) for 45 min. The mixture is cooled, water (20 ml) added and the mixture extracted with toluene. The toluene extract is washed with 5% sulfuric acid (5ml) and with water (5ml). The aqueous layer containing a dark heavy oil is combined with the aqueous washes. Conc. NH₄OH (10 ml) is added and the mixture extracted with toluene (10 ml and 2 × 5 ml). The combined toluene solution is washed with water (2 × 5 ml), dried (Na₂SO₄), treated with charcoal and evaporated under reduced pressure to afford the title compound; nmr (CDCl₃)δ) δ(3H), 2.32 (3H), corresponding hydrochloric acid addition salt has m.p. 193°–195°C, after recrystallization from isopropanol-ether.

The procedure of Example 61 is followed to prepare other compounds of formula I in which A is A², X is oxy or thio and R¹, R², R³, R⁴, R⁵, R⁶, R⁷, R¹⁷, R¹⁹ and Alk are as defined in the first instance. Examples of such compounds of formula I are listed in Tables III and IV. In each of these examples an equivalent amount of the respective starting material of formula II and the aminoketone of formula III, listed therein, is used instead of the starting material of formula II and the aminoketone employed in Example 61.

TABLE III

| Ex. | Starting Material of Formual II (B = B²) | | | | | | Aminoketone | Product: (Prefix Listed Below)-3,4-dihydro-1H-1,4-oxazino[4,3-a]indole |
|---|---|---|---|---|---|---|---|---|
| | $R^2$ | $R^3$ | $R^4$ | $R^5$ | $R^{17}$ | $R^{19}$ | Y | |
| 62 | H | H | H | H | $CH_3$ | H | OH 4-(methyl-amino)-2-butanone | 1,10-dimethyl-1-[2-(methyl-amino)ethyl], nmr (CDCl₃) δ 1.62 (s, 3H), 2.34 (s,3H), corresponding hydrobromide acid addition salt has m.p. 249–251°C., after recrystallization from isopropanol |
| 63 | H | H | H | H | $CH_3$ | H | OH 4-amino-2-butanone | 1-(2-aminoethyl)-1,10-dimethyl, nmr (CDCl₃) δ 1.62 (3H), 2.34 (3H) |
| 64 | H | H | H | H | $CH_3$ | H | OH 4-(dimethyl-amino)-2-butanone | 1,10-dimethyl-1-[(2-dimethyl-amino)ethyl], nmr (CDCl₃) δ 1.60 (3H), 2.30 (3H), corresponding hydrochloric acid addition salt has m.p. 237–239°C., after recrystallization from methanol-ether |
| 65 | H | H | H | H | $CH_3$ | H | OH 4-(diethyl-amino)-2-butanone | 1-[2-(diethylamino)ethyl]-1,10-dimethyl, nmr (CDCl₃) δ 1.60 (3H), 2.30 (3H), corresponding hydrobromic acid addition salt has m.p. 191–193°C., after recrystallization from isopropanol-ether |
| 66 | H | H | H | H | $CH_3$ | H | OH 4-(ethyl-amino)-2- | 1,10-dimethyl-1-[2-(ethyl-amino)ethyl], nmr (CDCl₃)δ |

TABLE III-continued

| Ex. | Starting Material of Formual II (B = B²) | | | | | | Aminoketone | Product: (Prefix Listed Below)-3,4-dihydro-1H-1,4-oxazino[4,3-a]indole |
|---|---|---|---|---|---|---|---|---|
| | R² | R³ | R⁴ | R⁵ | R¹⁷ | R¹⁹ | Y | |
| | | | | | | | butanone | 1.58 (3H), 2.32 (3H), corresponding hydrobromic acid addition salt has m.p. 196–198°C., after recrysytallization from isopropanol-ether |
| 67 | H | H | H | H | CH₃ | H | OH 4-(1-pyrrolidinyl)-2-butanone | 1,10-dimethyl-1-[2-(1-pyrrolidinyl)ethyl], nmr (CDCl₃) δ 1.60 (3H), 2.30 (3H), corresponding hydrochloric acid addition salt has m.p. 223–225°C., after recrystallization from isopropanol-ether |
| 68 | H | H | H | H | CH₃ | H | OH 4-piperidino-2-butanone | 1,10-dimethyl-1-(2-piperidinoethy), nmr (CDCl₃) δ 1.61 (3H), 2.33 (3H, corresponding hydrobromic acid addition salt has m.p. 253–155°C., after recrystallization from methanol |
| 69 | H | H | H | H | CH₃ | H | OH 4-morpholino-2-butanone | 1,10-dimethyl-1-(2-morpholinoethyl), nmr (CDCl₃) δ 1.60 (3H), 2.31 (3H), corresponding hydrochloric acid addition salt has m.p. 234–236°C., after recrystallization from isopropanol-ether |
| 70 | H | H | H | H | CH₃ | H | OH 4-(4-methyl-1-piperazinyl)-2-butanone | 1,10-dimethyl-1-[2-(4-methyl-1-piperazinyl)ethyl], nmr (CDCl₃) δ 1.62 (s, 3H), 2.32 (s, 3H), corresponding maleic acid addition salt (dimaleate) has m.p. 196–198°C., after recrystalliization from methanol |
| 71 | H | H | H | H | CH₃ | H | OH 5-(methylamino)-2-pentanone | 1-(3-aminopropyl)-1,10-dimethyl, nmr (CDCl₃) δ 1.58 (3H), 1.90 (2H), corresponding hydrochloric acid addition salt has m.p. 204–206°C., after recrystallization from methanol-ether |
| 72 | H | H | H | H | CH₃ | H | OH 5-(dimethylamino)-2-pentanone | 1,10-dimethyl-1-[3-(dimethylamino)propyl], nmr (CDCl₃) δ 1.64 (3H), 2.33 (3H), 2.35 (4H), corresponding |

TABLE III-continued

| Ex. | Starting Material of Formual II (B = B²) | | | | | | Aminoketone | Product: (Prefix Listed Below)-3,4-dihydro-1H-1,4-oxazino[4,3-a]indole |
|---|---|---|---|---|---|---|---|---|
| | $R^2$ | $R^3$ | $R^4$ | $R^5$ | $R^{17}$ | $R^{19}$ | Y | |
| 73 | H | H | H | H | $CH_3$ | H | OH | 5-(ethyl-amino-2-pentanone | hydrochloric acid addition salt has m.p. 200–210°C., after recrystallization from methanol-ether 1,10-dimethyl-1-[3-(ethyl-amino)propyl], nmr (CDCl$_3$) δ 1.61 (3H), 2.33 (3H), corresponding, hydrochloric acid addition salt has m.p. 220–222°C., after recrystallization from ethanol-ether |
| 74 | H | H | H | H | $CH_3$ | H | OH | 5-(diethyl-amino)-2-pentanone | 1-[3-(diethylamino)propyl]-1,10-dimethyl, nmr (CDCl$_3$) δ 0.94 (+, 6H), 1.58 (s, 3H), corresponding hydrobromic acid addition salt has m.p. 174–176°C., after recrystallization from isopropanol |
| 75 | H | H | H | H | $CH_3$ | H | OH | 1-(dimethyl-amino)-3-hexanone | 1-[2-(dimethylamino)ethyl]-10-methyl-1-propyl, nmr (CDCl$_3$) 1.64 (3H), 2.34 (3H) corresponding hydrobromic acid addition salt has m.p. 196–197°C., after recrystallization from isopropanol |
| 76 | H | H | H | H | $CH_3$ | H | OH | 1-(diethyl-amino)-3-hexanone | 1-[2-(diethylamino)ethyl]-10-methyl-1-propyl, nmr (CDCl$_3$) 1.62 (3H), 2.33 (3H), corresponding hydrobromic acid addition salt has m.p. 1.65–167°C., after recrystallization from isopropanol |
| 77 | H | H | H | H | $CH_3$ | H | OH | 5-(1-pyrro-lidinyl)-2-pentanone | 1,10-dimethyl-1-[3-(1-pyrro-lidinyl)propyl], nmr (CDCl$_3$) δ 1.61 (s, 3H), 4.03 (4H), corresponding hydrobromic acid addition salt has m.p. 154–156°C., after recrystallization from isopropanol |
| 78 | H | H | H | H | $CH_3$ | H | OH | 5-piperi-dino-2-pentanone | 1,10-dimethyl-1-(3-piperi-dinopropyl), nmr (CDCl$_3$) δ 1.60 (s, 3H), 2.29 (s, 3H), corresponding hydrobromic acid addition salt has m.p. 205–207°C., after recrystallization from isopropanol |
| 79 | H | H | H | H | $CH_3$ | H | OH | 5-morpholi-no-2-penta-none | 1,10-dimethyl-1-(3-morpho-linopropyl), nmr (CDCl$_3$) δ 1.60 (s, 3H), 4.02 (4H), corresponding hydrochloric acid addition salt has m.p. 210–212°C., after recrystallization from isopropanol |
| 80 | H | H | H | H | $CH_3$ | H | OH | 5-(4-methyl-1-pipera-zinyl)-2-pentanone | 1,10-dimethyl-1-[3-(4-methyl-1-piperazinyl)-propyl], nmr (CDCl$_3$) δ 1.63 (s, 3H), 2.31 (3H) corresponding hydrobromic acid addition salt (dihydrobromide) has m.p. 260–262°C., after recrystallization from methanol |
| 81 | $CH_3$ | $CH_3$ | H | H | $C_2H_5$ | H | OH | 1-(diethyl-amino)-2-propanone | 1-(diethylamino)methyl-10-ethyl-1,3,3-trimethyl |
| 82 | H | H | H | H | $C_2H_5$ | 4—$CH_3$ | OH | 2-piperi-dino-3- | 1,10-diethyl-9-methyl-1-(1-piperidinoethyl) |

TABLE III-continued

| Ex. | Starting Material of Formula II (B = B²) | | | | | | Aminoketone | Product: (Prefix Listed Below)-3,4-dihydro-1H-1,4-oxazino[4,3-a]indole |
|---|---|---|---|---|---|---|---|---|
| | R² | R³ | R⁴ | R⁵ | R¹⁷ | R¹⁹ | Y | |
| 83 | H | H | H | H | n—C₃H₇ | 5—C₂H₅O | OH | 4-(methyl-amino)-2-butanone | 8-ethoxy-1-methyl-1-[2-(methylamino)ethyl]-10-propyl |
| 84 | H | H | C₂H₅ | H | C₂H₅ | 6—C₂H₅ | OH | 1-(hexylamino)-3-pentanone | 1-[2-(hexylamino)ethyl]-1,4,7,10-tetramethyl |
| 85 | H | H | H | H | CH₃ | 6—Cl | OH | 4-(diethylamino)-3-methyl-2-butanone | 7-chloro-1-[2-(diethylamino)-1-methyl-ethyl]-1,10-dimethyl |
| 86 | CH₃ | CH₃ | H | H | CH₃ | 5—OH | OH | 3-ethyl-3-(hexylamino-methyl)-4-octanone | 1-butyl-1-[1,1-diethyl-2-(hexylamino)ethyl]-6-hydroxy-3,3,10-trimethyl |
| 87 | C₂H₅ | H | C₂H₅ | H | CH₃ | 4—I | OH | 2,2-dimethyl-6-(methylamino)-3-hexanone | 3,4-diethyl-9-iodo-1-iso-propyl-10-methyl-1-[3-(methylamino)propyl] |
| 88 | H | H | CH₃ | CH₃ | i—C₃H₇ | H | OH | 4,4-dimethyl-5-(dimethylamino)-3-methyl-2-methyl-2- | 1-[3-(dimethylamino)-10-isopropyl-1,2,2-trimethyl-propyl]-1,4,4-trimethyl |
| 89 | CH₃ | CH₃ | CH₃ | CH₃ | CH₃ | 5—OAc | OH | 6-(dimethylamino)-2-hexanone | 8-acetoxy-1-[4-(dimethylamino)butyl]-1,3,3,4,4,10-hexamethyl |
| 90 | H | H | H | H | C₂H₅ | 5—OCH₃ | OH | 7-(1-pyrrolidinyl)-3-heptanone | 1,10-diethyl-8-methoxy-1-[4-(1-pyrrolidinyl)butyl] |
| 91 | H | H | H | H | CH₃ | 7—CH₃ | OH | 4-(diethylamino)-2-butanone | 1-[2-(diethylamino)ethyl]-1,6,10-trimethyl |
| 92 | C₂H₅ | C₂H₅ | H | H | C₂H₅ | 4—Br | OH | 5-(dimethylamino)-5-methyl-3-hexanone | 9-bromo-1-[2,2-dimethyl-2-(dimethylamino)ethyl]-1,3,3,10-tetramethyl |

TABLE IV

| Ex. | Starting Material of Formula II (B = B²) | | | | | | Aminoketone | Product: (Prefix Listed Below)-3,4-dihydro-1H-1,4-thiazino[4,3-a]indole |
|---|---|---|---|---|---|---|---|---|
| | R² | R³ | R⁴ | R⁵ | R¹⁷ | R¹⁹ | Y | |
| 93 | H | H | H | H | CH₃ | H | SH | 4-(methylamino)-2-butanone | 1,10-dimethyl-1-[2-(methylamino)ethyl] |
| 94 | H | H | H | H | CH₃ | H | SH | 4-amino-2-butanone | 1-(2-aminoethyl)-1,10-dimethyl |
| 95 | H | H | H | H | CH₃ | H | SH | 4-(dimethylamino)-2-butanone | 1,10-dimethyl-1-[(2-dimethylamino)ethyl] |
| 96 | H | H | H | H | CH₃ | H | SH | 4-(diethylamino)-2-butanone | 1-[2-(diethylamino)ethyl]-1,10-dimethyl |
| 97 | H | H | H | H | CH₃ | H | SH | 4-(ethylamino)-2-butanone | 1,10-dimethyl-1-[2-(ethylamino)ethyl] |
| 98 | H | H | H | H | CH₃ | H | SH | 4-(1-pyrrolidinyl)-2-butanone | 1,10-dimethyl-1-[2-(1-pyrrolidinyl)ethyl] |
| 99 | H | H | H | H | CH₃ | H | SH | 4-piperidino-2-butanone | 1,10-dimethyl-1-(2-piperidinoethyl) |
| 100 | H | H | H | H | CH₃ | H | SH | 4-morpholino-2-butanone | 1,10-dimethyl-1-(2-morpholinoethyl) |
| 101 | H | H | H | H | CH₃ | H | SH | 4-(4-methyl-1-piperazinyl)-2-butanone | 1,10-dimethyl-1-[2-(4-methyl-1-piperazinyl)ethyl] |
| 102 | H | H | H | H | CH₃ | H | SH | 5-(methylamino)-2-pentanone | 1-(3-aminopropyl)-1,10-dimethyl |
| 103 | H | H | H | H | CH₃ | H | SH | 5-(dimethylamino)-2-pentanone | 1,10-dimethyl-1-[3-(dimethylamino)propyl] |
| 104 | H | H | H | H | CH₃ | H | SH | 5-(diethylamino)-2-pentanone | 1,10-dimethyl-1-[3-(ethylamino)propyl] |
| 105 | H | H | H | H | CH₃ | H | SH | 5-(diethylamino)-2-pentanone | 1-[3-(diethylamino)propyl]-1,10-dimethyl |
| 106 | H | H | H | H | CH₃ | H | SH | 1-(dimethylamino)-3-hexanone | 1-[2-(dimethylamino)ethyl]-10-methyl-1-propyl |

TABLE IV-continued

| Ex. | Starting Material of Formula II (B = B²) | | | | | | Aminoketone | Product: (Prefix Listed Below)-3,4-dihydro-1H-1,4-thiazino[4,3-a]indole |
|---|---|---|---|---|---|---|---|---|
| | $R^2$ | $R^3$ | $R^4$ | $R^5$ | $R^{17}$ | $R^{19}$ | Y | |
| 107 | H | H | H | H | $CH_3$ | H | SH | 1-(diethyl-amino)-3-hexanone | 1-[2-(diethylamino)ethyl]-10-methyl-1-propyl |
| 108 | H | H | H | H | $CH_3$ | H | SH | 5-(1-pyrrolidinyl)-2-pentanone | 1,10-dimethyl-1-[3-(1-pyrrolidinyl)propyl] |
| 109 | H | H | H | H | $CH_3$ | H | SH | 5-piperidino-2-pentanone | 1,10-dimethyl-1-(3-piperidino-propyl) |
| 110 | H | H | H | H | $CH_3$ | H | SH | 5-morpholino-2-pentanone | 1,10-dimethyl-1-(3-morpholino-propyl) |
| 111 | H | H | H | H | $CH_3$ | H | SH | 5-(4-methyl-1-piperazinyl)-2-pentanone | 1,10-dimethyl-1-[3-(4-methyl-1-piperazinyl)propyl] |
| 112 | H | H | H | H | $C_2H_5$ | H | SH | 1-(diethyl-amino)-2-propanone | 1-(diethylaminomethyl)-10-ethyl-1,3,3-trimethyl |
| 113 | H | H | H | H | $C_2H_5$ | 4—$CH_3$ | SH | 2-piperidino-3-pentanone | 1,10-diethyl-9-methyl-1-(1-piperidinoethyl) |
| 114 | H | H | H | H | n—$C_3H_7$ | 5—$C_2H_5O$ | SH | 4-(methyl-amino)-2-butanone | 8-ethoxy-1-methyl-1-[2-(methylamino)ethyl]-10-propyl |
| 115 | H | H | $C_2H_5$ | H | $C_2H_5$ | 6—$C_2H_5$ | SH | 1-(hexyl-amino)-3-pentanone | 1-[2-(hexylamino)ethyl]-1,4,7,10-tetramethyl |
| 116 | H | H | H | H | $CH_3$ | 6—Cl | SH | 4-(diethyl-amino)-3-methyl-2-butanone | 7-chloro-1-[2-(diethylamino-1-methyl-ethyl]-1,10-dimethyl |
| 117 | $CH_3$ | $CH_3$ | H | H | $CH_3$ | 5—OH | SH | 3-ethyl-3-(hexyl-aminomethyl)-4-octanone | 1-butyl-1-[1,1-diethyl-2-(hexylamino)ethyl]-6-hydroxy-3,3,10-trimethyl |
| 118 | $CH_3$ | H | $C_2H_5$ | H | $CH_3$ | 4—I | SH | 2,2-dimethyl-6-(methyl)-3-hexanone | 3,4-diethyl-9-iodo-1-iso-propyl-10-methyl-1-[3-methylamino)propyl] |
| 119 | H | H | $CH_3$ | $CH_3$ | i—$C_3H_7$ | H | SH | 4,4-dimethyl-5-(dimethyl-amino)-3-methyl-2-pentanone | 1-[3-(dimethylamino)-10-isopropyl-1,2,2-trimethyl-propyl]-1,4,4-trimethyl |
| 120 | $CH_3$ | $CH_3$ | $CH_3$ | $CH_3$ | $CH_3$ | 5—OAc | SH | 6-(dimethyl-amino)-2-hexanone | 8-acetoxy-1-[4-(dimethyl-amino)butyl]-1,3,3,4,4,10-hexamethyl |
| 121 | H | H | H | H | $C_2H_5$ | 5—$OCH_3$ | SH | 7-(1-pyrrolidinyl)-3-heptanone | 1,10-diethyl-8-methoxy-1-[4-(1-pyrrolidinyl)butyl] |
| 122 | H | H | H | H | $CH_3$ | 7—$CH_3$ | SH | 4-(diethyl-amino)-2-butanone | 1-[2-(diethylamino)ethyl]-1,6,10-trimethyl |
| 123 | $C_2H_5$ | $C_2H_5$ | H | H | $C_2H_5$ | 4—Br | SH | 5-(dimethyl-amino)-5-methyl-3-hexanone | 9-bromo-1-[2,2-dimethyl-2-(dimethylamino)ethyl]-1,3,3,10-tetramethyl |

EXAMPLE 124

N,N,1-Trimethyl-1,3,4,9-tetrahydroindeno[2,1-c]pyran-1-ethylamine (1; A = $A^3$, $R^1$ = $CH_3$, $R^2$, $R^3$, $R^4$, $R^5$, $R^{18}$ and $R^{19}$ = H, X = O, Alk = $CH_2CH_2$ and $R^6$ and $R^7$ = $CH_3$)

To a solution of 4-(dimethylamino)-2-butanone (1.0 g) dissolved in toluene (10 ml), p-toluenesulfonic acid (1.3 g) is added. The suspension is stirred for 10 min. Indene-3-ethanol (1.0 g) in toluene (5 ml) is added to the suspension and the resulting solution stirred for 2 hr. Boron trifluoride etherate (0.25 ml) is added together with ca. 0.5 g of hydrated alkali-aluminum silicate. The mixture is heated at 80°C for 30 min. The mixture is cooled and diluted with water. The organic layer is separated and the aqueous layer extracted with toluene. The organic layers are washed with water. The combined aqueous phase is rendered alkaline with conc.$NH_4OH$ and extracted with toluene. The latter extract is treated with charcoal and then concentrated to afford the title compound, nmr ($CDCl_3$) δ 1.42 (s, 3H), 1.70 - 2.80 (6H), 2.22 (s, 6H), 3.30 (+, 2H), 3.97 (+, 2H), 7.30 (m, 4H).

The corresponding hydrochloric acid addition salt, N,N,1-trimethyl-1,3,4,9-tetrahydroindeno[2,1-c]pyranl-ethylamine hydrochloride, has m.p. 266-268°C after recrystallization from ethanol.

The procedure of Example 124 is followed to prepare other compounds of formula I in which A is $A^3$, X is oxy or thio and $R^1$, $R^2$, $R^3$, $R^4$, $R^5$, $R^6$, $R^7$, $R^{18}$, $R^{19}$ and Alk are as defined in the first instance. Examples of such compounds of formula I are listed in Tables V and VI. In each of these examples an equivalent amount of the respective starting material of formula II and the aminoketone of formula III, listed therein, is used instead of the starting material of formula II and the aminoketone employed in Example 124.

TABLE V

| Ex. | Starting Material of Formual II (B = B³) | | | | | | | Aminoketone | Product: (Prefix Listed Below)-1,3,4,9-tetrahydro-indeno[2,1-c]pyran-1-(Suffix listed Below) |
|---|---|---|---|---|---|---|---|---|---|
| | R² | R³ | R⁴ | R⁵ | R¹⁸ | R¹⁹ | Y | | Prefix//Suffix |
| 125 | H | H | H | H | H | H | OH | 5-(dimethyl-amino)-2-pentanone | N,N,1-trimethyl//propyl-amine, nmr (CDCl₃) δ 1.42 (s, 3H), 3.30 (m³, 2H), 3.94 (t, 2H); corresponding hydrochloric acid addition salt has m.p. 210 – 212°C, after recrystallization from isopropanol |
| 126 | H | H | H | H | H | H | OH | 1-(dimethyl-amino)-2-propanone | N,N,1-trimethyl//methyl-amine, nmr (CDCl₃) δ 1.45 (s, 3H), 3.35 (m³, 4H), 3.94 (m, 2H); corresponding hydrochloric acid addition salt has m.p. 250 – 251°C., after recrystallization from isopropanol |
| 127 | H | H | H | H | H | H | OH | 4-(methyl-amino)-2-butanone | N,1-dimethyl//ethylamine |
| 128 | H | H | H | H | H | H | OH | 4-amino-2-butanone | 1-methyl/ethylamine |
| 129 | H | H | H | H | H | H | OH | 4-(1-pyrro-lidinyl)-2-butanone | 1-[(1-methyl//yl)ethyl]-pyrrolidine |
| 130 | H | H | H | H | H | H | OH | 4-piperidino-2-butanone | 1-[(1-methyl//yl)ethyl]-piperidine |
| 131 | H | H | H | H | H | H | OH | 4-morpholino-2-butanone | 1-[(1-methyl//yl)ethyl]-morpholine |
| 132 | H | H | H | H | H | H | OH | 4-(4-ethyl-1-pipera-zinyl)-2-butanone | 1-ethyl-4-[(1-methyl//yl)-ethyl]piperazine |
| 133 | H | H | H | H | H | H | OH | 5-(methyl-amino)-2-pentanone | N,1-dimethyl//propylamine |
| 134 | H | H | H | H | H | H | OH | 5-(diethyl-amino)-2-pentanone | N,N-diethyl-1-methyl//propylamine |
| 135 | H | H | H | H | H | H | OH | 5-(hexyl-amino)-2-pentanone | N-hexyl-1-methyl//propyl-amine |
| 136 | H | H | H | H | H | H | OH | 1-(dimethyl-amino)-3-hexanone | N,N-dimethyl-1-propyl//-ethylamine |
| 137 | H | H | H | H | H | H | OH | 1-(diethyl-amino)-2-methyl-3-hexanone | N,N-diethyl-1-propyl//-1-methylethylamine |
| 138 | H | H | H | H | CH₃ | H | OH | 5-(1-pyrro-lidinyl)-2-pentanone | 9-methyl-1-[(1-methyl//yl)-propyl]pyrrolidine |
| 139 | H | H | H | H | C₂H₅ | H | OH | 5-[4-(hydro-xyethyl)-1-piperazinyl]-2-pentanone | 9-ethyl-1-(hydroxyethyl)-4-[(1-methyl//yl)propyl]-piperazine |
| 140 | CH₃ | CH₃ | CH₃ | CH₃ | CH₃ | 6—CH₃ | OH | 1-(diethyl-amino)-2-propanone | N,N-diethyl-1,3,3,4,4,7,9-heptamethyl//methylamine |
| 141 | H | H | n—C₃H₇ | H | H | 4—F | OH | 2-piperidino-3-pentanone | 1-[(1-ethyl-5-fluoro-4-propyl//yl-1-methyl-methyl]-piperidine |
| 142 | H | H | H | H | H | 5—CH₃O | OH | 3-ethyl-3-(methyl-aminomethyl)-4-octanone | 1-butyl-6-methoxy-N-methyl//-1,1-diethylethylamine |
| 143 | CH₃ | H | CH₃ | H | H | 7—OAc | OH | 4,4-dimethyl-5-(dimethyl-amino)-3-methyl-2-pentanone | 8-acetoxy-N,N-dimethyl-3,4-dimethyl// 1,2,2-trimethyl-propylamine |
| 144 | H | H | H | H | H | H | OH | 6-(dimethyl-amino)-2-hexanone | N,N,1-trimethyl//butylamine |
| 145 | H | H | H | H | H | H | OH | 7-pipera-zino-3-heptanone | 1-[(1-ethyl//yl)butyl]-piperazine |
| 146 | H | H | H | H | H | 5—Cl | OH | 7-(amino-methyl)-2,2-dimethyl-3-octanone | 6-chloro-1-isopropyl-N-methyl// 4-methylbutylamine |

TABLE VI

| Ex. | Starting Material of Formula II (B = B³) | | | | | | | Aminoketone | Product: (Prefix Listed Below)-1,3,4,9-tetrahydro-indeno[2,1-c]thiopyran-1- (Suffix Listed Below) Prefix//Suffix |
|---|---|---|---|---|---|---|---|---|---|
| | R² | R³ | R⁴ | R⁵ | R¹⁸ | R¹⁹ | Y | | |
| 147 | H | H | H | H | H | H | SH | 4-(dimethyl-amino)-2-butanone | N,N,1-trimethyl//ethylamine, nmr (CDCl₃) δ 1.45 (s, 3H), 3.50 (m, 2H), 7.32 (m, 4H), corresponding hydrochloric acid addition salt has m.p. 265 – 267°C., after recrystallization from ethanol |
| 148 | H | H | H | H | H | H | SH | 1-(dimethyl-amino)-2-propanone | N,N,1-trimethyl//methylamine |
| 149 | H | H | H | H | H | H | SH | 4-(methyl-amino)-2-butanone | N,1-dimethyl//ethylamine |
| 150 | H | H | H | H | H | H | SH | 4-amino-2-butanone | 1-methyl//ethylamine |
| 151 | H | H | H | H | H | H | SH | 4-(1-pyrro-lidinyl)-2-butanone | 1-[(1-methyl//yl)ethyl]-pyrrolidine |
| 152 | H | H | H | H | H | H | SH | 4-piperi-dino-2-butanone | 1-[(1-methyl//yl)ethyl]-piperidine |
| 153 | H | H | H | H | H | H | SH | 4-morpho-lino-2-butanone | 1-[(1-methyl//yl)ethyl]-morpholine |
| 154 | H | H | H | H | H | H | SH | 4-(4-ethyl-1-pipera-zinyl)-2-butanone | 1-ethyl-4-[(1-methyl//yl)-ethyl]piperazine |
| 155 | H | H | H | H | H | H | SH | 5-(methyl-amino)-2-pentanone | N,1-dimethyl//propylamine |
| 156 | H | H | H | H | H | H | SH | 5-(diethyl-amino)-2-pentanone | N,N-diethyl-1-methyl//-propylamine |
| 157 | H | H | H | H | H | H | SH | 5-(hexyl-amino)-2-pentanone | N-hexyl-1-methyl//propylamine |
| 158 | H | H | H | H | H | H | SH | 1-(dimethyl-amino)-3-hexanone | N,N-dimethyl-1-propyl//-ethylamine |
| 159 | H | H | H | H | H | H | SH | 1-(diethyl-amino)-2-methyl-3-hexanone | N,N-diethyl-1-propyl//-1-methylethylamine |
| 160 | H | H | H | H | CH₃ | H | SH | 5-(1-pyrro-lidinyl)-2-pentanone | 9-methyl-1-[(1-methyl//yl)-propyl]pyrrolidine |
| 161 | H | H | H | H | C₂H₅ | H | SH | 5-[4-(hydro-xyethyl)-1-piperazinyl]-2-pentanone | 9-ethyl-1-(hydroxyethyl)-4-[(1-methyl//yl)propyl]-piperazine |
| 162 | CH₃ | CH₃ | CH₃ | CH₃ | CH₃ | 6—CH₃ | SH | 1-(diethyl-amino)-2-propanone | N,N-diethyl-1,3,3,4,4,7,9-heptamethyl//methylamine |
| 163 | H | H | n—C₃H₇ | H | H | 4—F | SH | 2-piperidino-3-pentanone | 1-[(1-ethyl-5-fluoro-4-propyl//yl)-1-methyl-methyl]piperidine |
| 164 | H | H | H | H | H | 5—CH₃O | | 3-ethyl-3-(methyl-aminomethyl)-4-octanone | 1-butyl-6-methoxy-N-methyl//-1,1-diethylethylamine |
| 165 | CH₃ | H | CH₃ | H | H | 7—OAc | SH | 4,4-dimethyl-5-(dimethyl-amino)-3-methyl-2-pentanone | 8-acetoxy-N,N-dimethyl-3,4-dimethyl// 1,2,2-trimethyl-propylamine |
| 166 | H | H | H | H | H | H | SH | 6-(dimethyl-amino)-2-hexanone | N,N,1-trimethyl//butyl-amine |
| 167 | H | H | H | H | H | H | SH | 7-pipera-zino-3-heptanone | 1-[(1-ethyl//yl)butyl]piper-azine |
| 168 | H | H | H | H | H | 5—Cl | SH | 7-(amino-methyl)-2,2-dimethyl-3-octanone | 6-chloro-1-isopropyl-N-methyl// 4-methylbutylamine |

EXAMPLE 169

1-[2-(Dimethylamino)ethyl]-9-ethyl-1-methyl-1,3,4,9-tetrahydrothiopyrano[3,4-b]indole (1; A = A¹, R¹ = CH₃, R², R³, R⁴, R⁵ and R¹⁹ = H, R¹⁶ = C₂H₅, X = O, Alk = CH₂CH₂ and R⁶ and R⁷ = CH₃)

To a stirred solution of p-toluenesulfonic acid monohydrate (57.0 g) in toluene (400 ml) at 80°C. under nitrogen, the ketoamine, 4-(dimethylamino)-2-butanone (13.8 g), is added. Thereafter, the starting material of formula II, sodium 1-ethylidinole-3-ethyl thiosulfate (30.7 g), prepared from 1-ethylindole-3-ethanol according to the procedure of Suvorov and Buyanov, cited above, is added portionwise over a period of 5 minutes. The mixture is maintained at 80°C. for 1 ¼ hr. with stirring then cooled and diluted with 20% sodium hydroxide (66 ml) followed by water (100 ml) and extracted with toluene. The toluene extract is washed with 20 percent sulfuric acid (5 × 30 ml) and with water (5 × 30 ml). The combined aqueous phases plus solid precipitating therefrom are rendered alkaline with 20 percent sodium hydroxide and then extracted with toluene (4 × 50 ml). The combined toluene solution is washed with water, dried (Na$_2$SO$_4$), and evaporated. The residue is recrystallized from ether-hexane to give the title compound, m.p. 86°–88°C., $\lambda_{max}^{CHCl_3}$ 2820, 2765, $^{-1}$ 1600, 1568, 1537 cm$^{-1}$, identical to the product of Example 56. The corresponding hydrochloric acid addition salt of the title compound has m.p. 225°-227°C. after recrystallization from isopropanol.

In the same manner but using an equivalent amount of potassium 1-ethylindole-3-ethyl thiosulfate the title compound is also obtained.

By following the procedure of this example other compounds of formula I, for example those described in Example 33 to 60, 93 to 123 and 147 to 168, may be prepared by the appropriate choice of the starting material of formula II in which Y is —S-SO$_3$Na or —S-SO$_3$K and the aminoketone of formula III.

For example, by replacing sodium 1-ethylindole-3-ethyl thiosulfate in this example with an equivalent amount of indene-3-ethyl thiosulfate, described in Example 3, N,N,1-trimethyl-1,3,4,9-tetrahydroindeno[2,1-a]thiopyranl-ethylamine, identical to the product of Example 147, is obtained.

Likewise, by replacing sodium 1-ethylindole-3-ethyl thiosulfate and 4-dimethylamino)-2-butanone with equivalent amounts of sodium 3-methylindole-1-ethyl thiosulfate, described in Example 2, and 5-(dimethylamino)-2-pentanone, respectively, 1,10-dimethyl-1-[3-(dimethylamino)propyl]-3,4-dihydro-1H-1,4-thazino[4,3-a]indole, identical to the product of Example 103, is obtained.

We claim:

1. A process for the preparation of 9-ethyl-1-methyl-1-[2-(dimethylamino)ethyl]-1,3,4,9-tetrahydrothiopyrano-[3,4-b]indole which comprises reacting 1-ethylindole-3-ethanethiol with 4-dimethylamino-2-butanone in the presence of an acid catalyst selected from the class consisting of p-toluenesulfonic acid, aluminum chloride, phosphorus pentoxide, boron trifluoride, zinc chloride, hydrochloric acid, perchloric acid, trifluoroacetic acid and sulfuric acid from 30 minutes to 48 hours at a temperature within the range from 20°C. to 200°C.

2. A process for the preparation of 1,10-dimethyl-1-[3-(methylamino)propyl]-3,4-dihydro-1H-1,4-oxazino[4,3-a]indole which comprises reacting 3-methylindole-1-ethanol with 5-(methylamino)-2-pentanone in the presence of an acid catalyst selected from the class consisting of p-toluenesulfonic acid, aluminum chloride, phosphorus pentoxide, boron trifluoride, zinc chloride, hydrochloric acid, perchloric acid, trifluoroacetic acid and sulfuric acid for 30 minutes to 48 hours at a temperature within the range from 20°C. to 200°C.

3. A process for the preparation of N,N,1-trimethyl-1,3,4,9-tetrahydro-indeno[2,1-c]pyran-1-ethylamine which comprises reacting indene-3-ethanol with 4-(dimethylamino)-2-butanone in the presence of an acid catalyst selected from the class consisting of p-toluenesulfonic acid, aluminum chloride, phosphorus pentoxide, boron trifluoride, zinc chloride, hydrochloric acid, perchloric acid, trifluoroacetic acid and sulfuric acid from 30 minutes to 48 hours at a temperature within the range from 20°C. to 200°C.

4. The process of claim 3 wherein said temperature is within the range from 60° to 140°C.

5. The process of claim 4 wherein the reaction time is from about ½ hour to 48 hours.

6. A process for the preparation of a 1-lower alkyl-1-aminoalkyl-1,3,4,9-tetrahydropyrano or-tetrahydrothiopyrano-[3,4-b]indole which comprises reacting an appropriate indole-3-ethanol or indole-3-ethanethiol, or the sodium or potassium salt of β-(3-indolyl) ethylthiosulfate with a (lower alkyl)

$$-\overset{O}{\underset{H}{C}}-$$

(alkylamine) in the presence of a Friedel-Crafts reaction catalyst.

7. A process for the preparation of a 1,10-di(lower) alkyl-1-aminoalkyl-3,4-dihydro-1H-1,4-oxazino or thiazino[4,3-a] indole which comprises reacting an appropriate 3-(lower alkyl)indole-1-ethanol or-ethanethiol or the sodium or potassium salt of β-(1-indolyl)-ethylthiosulfate with a (lower alkyl)

$$-\overset{O}{\underset{H}{C}}-$$

(alkylamine) in the presence of a Friedel-Crafts reaction catalyst.

8. A process for the preparation of a 1-lower alkyl-1,3,4,9-tetrahydroindeno-[2,1-C]pyran or-thiopyran-1-alkylamine which comprises reacting an appropriate indene-3-ethanol or indene-3-ethanethiol or the corresponding sodium or potassium salt of β-(3-indenyl)ethylthiosulfate with a (lower alkyl)

$$-\overset{O}{\underset{H}{C}}-$$

(alkylamine) in the presence of a Friedel-Crafts reaction catalyst.

9. A process for the preparation of a compound of the formula

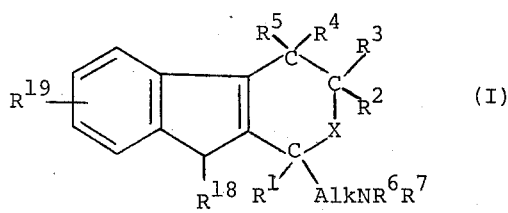

in which R$^1$ is lower alkyl, R$^2$, R$^3$, R$^4$ and R$^5$ are the same or different selected from the group consisting of hydrogen and lower alkyl; R$^6$ and R$^7$ are either the same or different selected from the group consisting of hydrogen and lower alkyl, or $R^6$ and $R^7$ together with the nitrogen atom to which they are joined form a heterocyclic amine radical selected from the group consisting of 1-pyrrolidinyl, piperidino, morpholino, piperazino, 4-(lower alkyl)-1-piperazinyl and 4-[hydroxy(lower)alkyl]-1-piperazinyl; Alk is an alkylene selected from the group consisting of $CR^8R^9$, $CR^8R^9CR^{10}R^{11}$, $CR^8R^9CR^{10}R^{11}CR^{12}R^{13}$ and $CR^8R^9CR^{10}R^{11}CR^{12}R^{13}CR^{14}R^{15}$ wherein $R^8$, $R^9$, $R^{10}$, $R^{11}$, $R^{12}$, $R^{13}$, $R^{14}$ and $R^{15}$ are hydrogen or lower alkyl; X is oxy or thio; $R^{18}$ is hydrogen or lower alkyl, and $R^{19}$ is hydrogen, lower alkyl, hydroxy, lower alkoxy, lower alkanoyloxy or halo, or a corresponding acid addition salt thereof, which comprises treating a compound of the formula

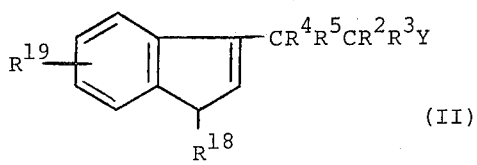

(II)

in which $R^{18}$ and $R^{19}$ are as defined herein, $R^2$, $R^3$, $R^5$ and $R^5$ are as defined herein and Y is hydroxy, mercapto, —S-SO₃-Na or —S-SO₃-K, with a compound of the formula $R^1CO$-Alk-$NR^6R^7$ (III) in which $R^1$, Alk, $R^6$ and $R^7$ are as defined herein or a corresponding acid addition salt thereof, in the presence of an acid catalyst.

10. A process as claimed in claim 9 in which the acid catalyst is selected from the group consisting of boron trifluoride, p-toluenesulfonic acid, aluminum chloride and phosphorus pentoxide.

11. A process as claimed in claim 9 in which the reactants are utilized in substantially equimolar amounts and the acid catalyst ranges from 1.01 to 100 molar equivalents with respect to the compound of formula III or from 0.01 to 100 molar equivalent with respect to the corresponding acid addition salt of the compound of formula III.

12. A process as claimed in claim 9 in which the process is performed with a reaction time of one half to 48 hours and with a temperature of from 20° to 200°C.

13. The process of claim 9 wherein X is oxy and Y is hydroxy.

14. The process of claim 9 wherein $R^6$ and $R^7$ are the same or different selected from the group consisting of hydrogen or lower-alkyl.

15. The process of claim 14 wherein X is oxy and Y is hydroxy.

16. The process of claim 14 wherein X is thio and Y is mercapto, —S-SO₃-Na, or —S-SO₃-K.

17. The process of claim 15 wherein $R^{19}$ is hydrogen or lower-alkyl.

18. A process for the preparation of a 1-lower alkyl-1,3,4,9-tetrahydroindeno-[2,1-c]pyran or -thiopyran-1-alkylamine which comprises reacting an appropriate compound of formula II, indene-3-ethanol, indene-3-ethanethiol or the corresponding sodium or potassium salt of β-(3-indenyl)ethylthiosulfate with a (lower alkyl)

(alkylamine) in the presence of a Friedel-Crafts reaction catalyst.

19. The process of claim 18, for the preparation of a 1-lower alkyl-1,3,4,9-tetrahydroindeno-[2,1-c]pyran-1-alkylamine, wherein said compound of formula II is indene-3-ethanol.

20. The process of claim 19 wherein the process is performed with a reaction time of one half to 48 hours and with a temperature range of from 60° to 140°C.

21. A process for the preparation of 9-ethyl-1-methyl-1-[2-(dimethylamino)ethyl]-1,3,4,9-tetrahydrothiopyrano-[3,4-b]indole which comprises reacting sodium 1-ethylindole-3-ethylthiosulfate [1-ethylindole-3-ethanethiol] with 4-dimethylamino-2-butanone in the presence of an acid catalyst selected from the class consisting of p-toluenesulfonic acid, aluminum chloride, phosphorus pentoxide, boron trifluoride, zinc chloride, hydrochloric acid, perchloric acid, trifluoroacetic acid and sulfuric acid from 30 minutes to 48 hours at a temperature within the range from 20°C. to 200°C.

22. A process for the preparation of a compound of formula I

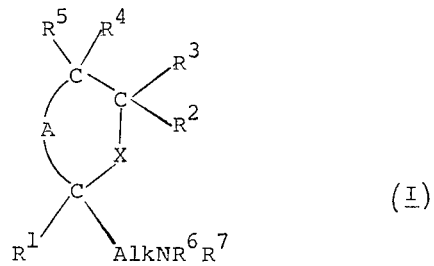

(I)

in which $R^1$ is lower alkyl, $R^2$, $R^3$, $R^4$ and $R^5$ are the same or different selected from the group consisting of hydrogen and lower alkyl, $R^6$ and $R^7$ are either the same or different selected from the group consisting of hydrogen and lower alkyl, or $R^6$ and $R^7$ together with the nitrogen atom to which they are joined form a heterocyclic amine radical selected from the group consisting of 1-pyrrolidinyl, piperidino, morpholino, piperazino, 4-(lower alkyl)-1-piperazinyl and 4-[hydroxy(lower)alkyl]-1-piperazinyl, Alk is an alkylene selected from the group consisting of $CR^8R^9$, $CR^8R^9CR^{10}R^{11}$, $CR^8R^9CR^{10}R^{11}CR^{12}R^{13}$ and $CR^8R^9CR^{10}R^{11}CR^{12}R^{13}CR^{14}R^{15}$, wherein $R^8$, $R^9$, $R^{10}$, $R^{11}$, $R^{12}$, $R^{13}$, $R^{14}$, $R^{15}$ are hydrogen or lower alkyl, X is oxy or thio and A is selected from the group consisting of

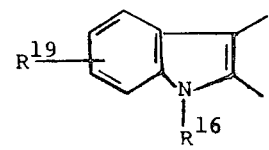

$A^1$

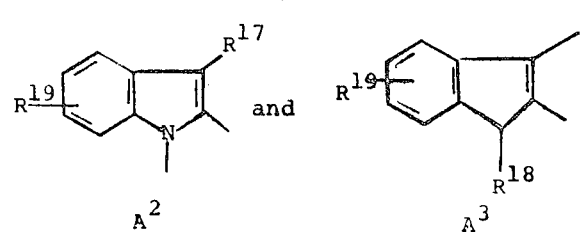

$A^2$ and $A^3$ in which $R^{16}$ is hydrogen or lower alkyl, $R^{17}$ is lower alkyl, $R^{18}$ is hydrogen or lower alkyl, and $R^{19}$ is hydrogen, lower alkyl, hydroxy, lower alkoxy, lower alkanoyloxy or halo, or a corresponding acid addition salt thereof, which comprises treating a compound of formula B-CR⁴R⁵CR²R³Y (II) in which B is selected from the group consisting of

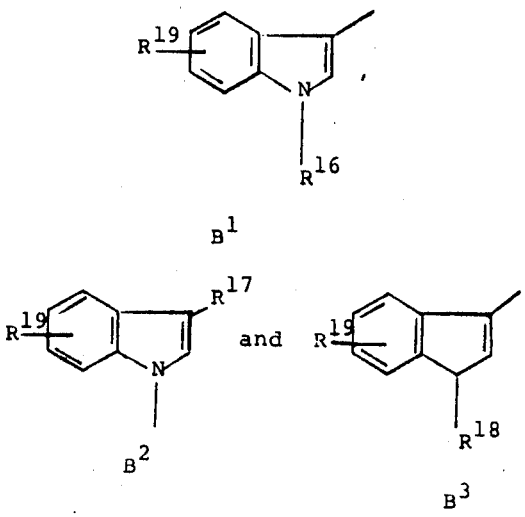

in which R¹⁶, R¹⁷, R¹⁸ and R¹⁹ are as defined herein, R², R³, R⁴ and R⁵ are as defined herein and Y is hydroxy, mercapto, -S-SO₃-Na or -S-SO₃-K, with a compound of formula R¹CO Alk NR⁶R⁷ (III) in which R¹, Alk, R⁶ and R⁷ are as defined herein or a corresponding acid addition salt thereof, in the presence of an acid catalyst.

23. A process as claimed in claim 22 in which the acid catalyst is selected from the group consisting of boron trifluoride, p-toluenesulfonic acid, aluminum chloride and phosphrorus pentoxide.

24. A process as claimed in claim 22 in which the reactants are utilized in substantially equimolar amounts and the acid catalyst ranges from 1.01 to 100 molar equivalents with respect to the compound of formula III or from 0.01 to 100 molar equivalent with respect to the corresponding acid addition salt of the compound of formula III.

25. A process as claimed in claim 22 in which the process is performed with a reaction time of one half to 48 hours and with a temperature range of from 20° to 200°C.

26. The process of claim 22 wherein said temperature is within the range from 60° to 140°C.

27. The process of claim 22 wherein the reaction time is from about ½ hour to 48 hours.

28. The process of claim 22 wherein X is oxy and Y is hydroxy.

29. The process of claim 22 wherein R⁶ and R⁷ are the same or different selected from the group consisting of hydrogen or lower-alkyl.

30. The process of claim 29 wherein X is oxy and Y is hydroxy.

31. The process of claim 22 wherein X is thio and Y is mercapto, —S-SO₃-Na, or —S-SO₃-K.

32. The process of claim 30 wherein R¹⁹ is hydrogen or lower-alkyl.

* * * * *